United States Patent
Moran et al.

(10) Patent No.: US 12,147,805 B2
(45) Date of Patent: Nov. 19, 2024

(54) MONITORING OF PROGRAM INSTRUCTIONS

(71) Applicant: Arm Limited, Cambridge (GB)

(72) Inventors: Brendan James Moran, Coton (GB); Michael Bartling, Austin, TX (US)

(73) Assignee: Arm Limited, Cambridge (GB)

( * ) Notice: Subject to any disclaimer, the term of this patent is extended or adjusted under 35 U.S.C. 154(b) by 76 days.

(21) Appl. No.: 18/117,186

(22) Filed: Mar. 3, 2023

(65) Prior Publication Data
US 2024/0296049 A1     Sep. 5, 2024

(51) Int. Cl.
| | |
|---|---|
| G06F 9/30 | (2018.01) |
| G06F 9/38 | (2018.01) |
| G06F 11/34 | (2006.01) |

(52) U.S. Cl.
CPC ........ G06F 9/30087 (2013.01); G06F 9/3861 (2013.01); G06F 11/34 (2013.01); *G06F 2201/865* (2013.01); *G06F 2201/88* (2013.01)

(58) Field of Classification Search
CPC .... G06F 9/30087; G06F 9/3861; G06F 11/34; G06F 2201/865; G06F 2201/88
See application file for complete search history.

(56) References Cited

U.S. PATENT DOCUMENTS

| | | | | |
|---|---|---|---|---|
| 6,937,961 | B2 * | 8/2005 | Cabral | G06F 11/349 |
| | | | | 702/182 |
| 7,369,954 | B2 * | 5/2008 | Levine | G06F 11/3466 |
| | | | | 702/187 |
| 7,917,677 | B2 * | 3/2011 | Johnson | G06F 13/24 |
| | | | | 717/154 |
| 8,171,340 | B2 * | 5/2012 | Molnar | G06F 11/3612 |
| | | | | 714/25 |
| 9,274,858 | B2 * | 3/2016 | Milliron | G06F 11/3089 |
| 2009/0319758 | A1 * | 12/2009 | Kimura | G06F 9/3851 |
| | | | | 712/E9.001 |

* cited by examiner

*Primary Examiner* — Corey S Faherty
(74) *Attorney, Agent, or Firm* — NIXON & VANDERHYE P.C.

(57) ABSTRACT

There is provided an apparatus and method, the apparatus comprising storage circuitry to store event information associated with instructions occurring between instrumentation points. The event information indicates a plurality of different types of events expected to occur during execution of the instructions. The event information comprises, for each event, type information indicating a type of that event and an expected number of occurrences of that event. The apparatus is also provided with monitoring circuitry comprising a plurality of programmable counters. The monitoring circuitry is responsive to a start instrumentation point, to assign at least a subset of the plurality of programmable counters to measure, during execution of the program instructions, occurrences of the plurality of different types of events identified in the event information. The monitoring circuitry is responsive to at least one counter deviating from the expected number of occurrences indicated by that counter, to perform a predetermined action.

20 Claims, 11 Drawing Sheets

MONITORING OF PROGRAM INSTRUCTIONS

TECHNICAL FIELD

The present invention relates to data processing. More particularly the present invention relates to an apparatus and a method of data processing.

BACKGROUND

During execution of instructions, it may be desirable to confirm whether the instructions that are executed conform to expected behaviours. Monitoring on a per instruction basis may be expensive in terms of hardware requirements and processing resources.

SUMMARY

In example configurations described herein there is an apparatus comprising:
  storage circuitry configured to store event information associated with a sequence of instructions occurring between instrumentation points, the event information indicative of a plurality of different types of events expected to occur during execution of the sequence of instructions, wherein the event information comprises, for each event of the plurality of different types of events, type information indicating a type of that event and an expected number of occurrences of that event; and monitoring circuitry comprising a plurality of programmable counters, the monitoring circuitry responsive to a start instrumentation point of the instrumentation points, to assign at least a subset of the plurality of programmable counters to measure, during execution of the sequence of program instructions, occurrences of the plurality of different types of events identified in the event information, wherein the monitoring circuitry is responsive to at least one counter of the subset deviating from the expected number of occurrences of the event indicated by that counter, to perform a predetermined action.

In example configurations herein there is an apparatus comprising:
  storage circuitry to store information indicative of a sequence of instructions; and
  static analysis circuitry configured to analyse the information indicative of the sequence of instructions to generate event information indicative of a plurality of different types of events expected to occur during execution of the sequence of instructions, wherein the event information comprises, for each event of the plurality of different types of events, type information indicating a type of that event and an expected number of occurrences of that event,
  wherein the static analysis circuitry is configured to define the event information to cause monitoring circuitry to respond to an instrumentation point occurring during execution of the sequence of instructions by assigning at least a subset of a plurality of programmable counters to measure, during execution of the sequence of program instructions, occurrences of the plurality of different types of events identified in the event information, and to trigger the monitoring circuitry to respond to at least one counter of the subset deviating from the expected number of occurrences of the event indicated by that counter, by performing a predetermined action.

In example configurations described herein there is a method comprising:
  storing event information associated with a sequence of instructions occurring between instrumentation points, the event information indicative of a plurality of different types of events expected to occur during execution of the sequence of instructions, wherein the event information comprises, for each event of the plurality of different types of events, type information indicating a type of that event and an expected number of occurrences of that event;
  in response to a start instrumentation point of the instrumentation points, assigning at least a subset of a plurality of programmable counters to measure, during execution of the sequence of program instructions, occurrences of the plurality of different types of events identified in the event information; and
  in response to at least one counter of the subset deviating from the expected number of occurrences of the event indicated by that counter, performing a predetermined action.

In example configurations described herein there is a method comprising:
  storing information indicative of a sequence of instructions;
  analysing the information indicative of the sequence of instructions to generate event information indicative of a plurality of different types of events expected to occur during execution of the sequence of instructions, wherein the event information comprises, for each event of the plurality of different types of events, type information indicating a type of that event and an expected number of occurrences of that event,
  defining the event information to cause monitoring circuitry to respond to an instrumentation point occurring during execution of the sequence of instructions by assigning at least a subset of a plurality of programmable counters to measure, during execution of the sequence of program instructions, occurrences of the plurality of different types of events identified in the event information, and to trigger the monitoring circuitry to respond to at least one counter of the subset deviating from the expected number of occurrences of the event indicated by that counter, by performing a predetermined action.

BRIEF DESCRIPTION OF THE DRAWINGS

The present invention will be described further, by way of example only, with reference to configurations thereof as illustrated in the accompanying drawings, in which.

DESCRIPTION OF EXAMPLE CONFIGURATIONS

Figure 1:
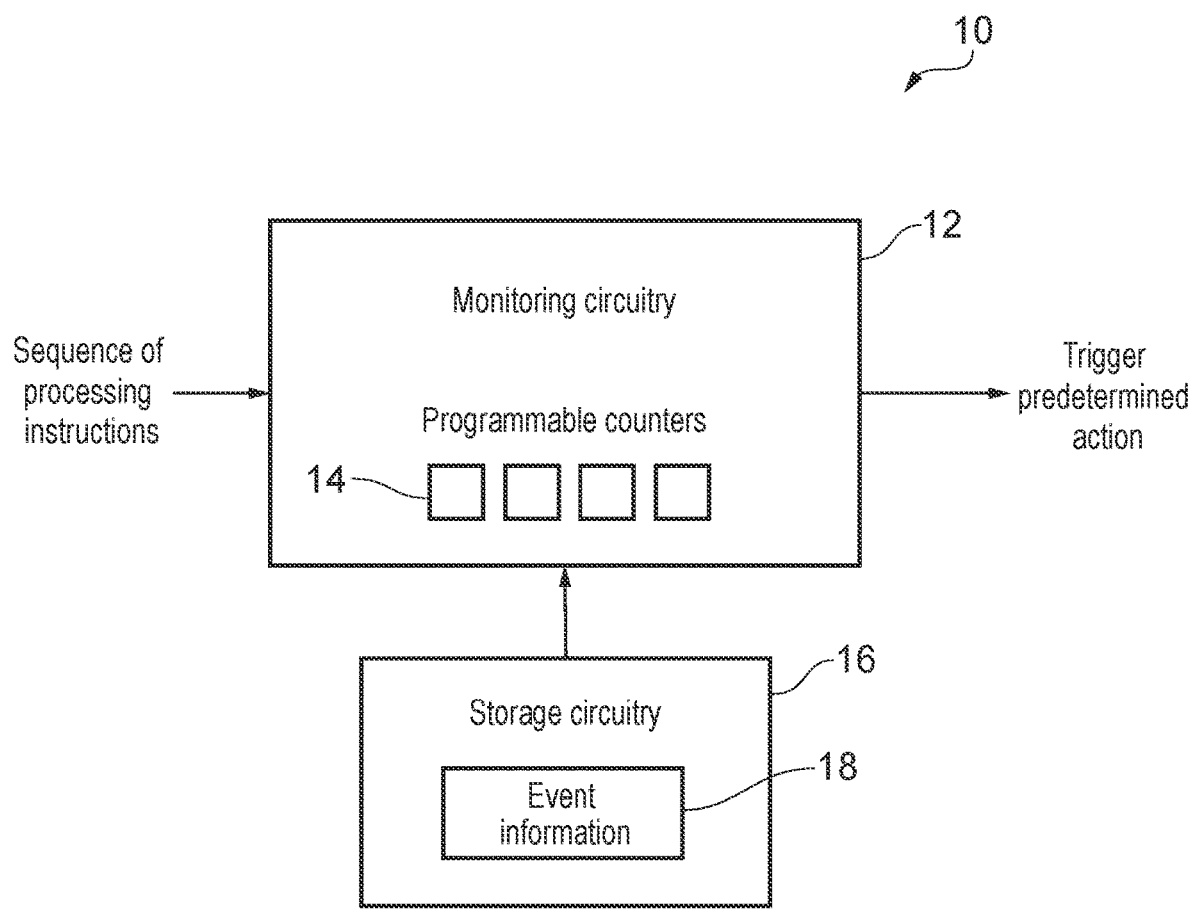
FIG. 1 schematically illustrates an apparatus according to some example configurations of the present techniques.

Before discussing the configurations with reference to the accompanying figures, the following description of configurations is provided.

In accordance with one example configuration there is provided an apparatus comprising storage circuitry configured to store event information associated with a sequence of instructions occurring between instrumentation points. The event information is indicative of a plurality of different types of events that are expected to occur during execution of the sequence of instructions. The event information comprises, for each event of the plurality of different types of events, type information indicating a type of that event and an expected number of occurrences of that event. The apparatus is also provided with monitoring circuitry comprising a plurality of programmable counters. The monitoring circuitry responsive to a start instrumentation point of the instrumentation points, to assign at least a subset of the plurality of programmable counters to measure, during execution of the sequence of program instructions, occurrences of the plurality of different types of events identified in the event information. The monitoring circuitry is responsive to at least one counter of the subset deviating from the expected number of occurrences of the event indicated by that counter, to perform a predetermined action.

During execution of a sequence of instructions, one or more different types of events may occur. The events that are expected to occur during execution of the sequence of instructions are recorded in the event information. If the sequence of instructions that is executed deviates from an expected sequence of instructions then it is likely that the events that occur during execution of that sequence of instruction will also deviate from the events that are indicated in the event information. The event information indicates both the types of events that are expected to occur between instrumentation points, and an expected number of occurrences of each event within the instrumentation points. The inventors have realised that, during execution of a given sequence of instructions, not all of the possible events that could be counted will be required in order to determine whether the given sequence of instructions has executed as expected. In order to count the events that are identified in event information associated with a sequence of instructions, the apparatus is provided with a plurality of programmable counters which can each be assigned to count one or more of the types of event that are identified in the event information. Because the counters are programmable, they can be dynamically reconfigured such that the events that are counted are those that are relevant to the sequence of instructions. Therefore, the total number of counters that are required can be kept low resulting in a compact implementation that can retain the information necessary to determine whether events that occur during the sequence of instructions deviate from those indicated in the event information. The apparatus is also provided with monitoring circuitry that compares the values that are indicated in each of the plurality of counters that have been assigned to particular events in order to determine whether the number of occurrences indicated by those counters deviates from a corresponding expected number of occurrences. When it is determined that this is the case the monitoring circuitry performs a predetermined action.

The apparatus comprises one or more circuitry blocks, i.e., the storage circuitry and the monitoring circuitry. Such circuitry blocks may be provided as discrete circuits within a one or more integrated circuits. Alternatively, the circuitry blocks may be provided as one or more combined circuits within one or more integrated circuits that provide the same function as the circuitry blocks. The programmable counters may be provided as storage circuits configured to store the counted values for local comparison to the expected number of occurrences of the events, alternatively, the programmable counters may be programmable telemetry counters configured to store and transmit the counted values to be processed elsewhere on a same integrated circuit or on a different integrated circuit. The events may be any type of event that occurs during processing of instructions and may comprise one or more flow altering events, for example, function calls/returns, and/or branch instructions; cache accesses; memory accesses; exceptions taken and returned; context switches; software initiated changes to the program counter; and/or events relating to speculative execution relating to prefetches, and/or branch mispredictions. In some example configurations, the monitoring circuitry may be configured to determine occurrences of the events using one or more event busses configured to signal occurrence of processing events. The instrumentation points may be inserted by a programmer or compiler at any points within the sequence of instructions. For example, there may be key parts of a program that, for security reasons, it may be beneficial to ensure that those parts of the program have executed correctly. The programmer or compiler can therefore position instrumentation points so that the monitoring circuitry counts event occurrences during, for example, only those parts of the program thereby reducing overheads associated with monitoring whilst other portions of the program are being executed.

In some configurations the plurality of programmable counters comprises a combinatorial programmable counter; and the monitoring circuitry is responsive to the event information identifying a combinatorial event comprising two or more events of the plurality of different types of event, to assign the combinatorial programmable counter to the two or more events. The combinatorial counter may provide a coarse level of assurance that the sequence of instructions is executing as expected. For example, the combinatorial counter could be configured to count a total number of events that occur between the instrumentation points to ensure that the total number of events does not exceed an expected total number of events. In some configurations, the combinatorial counter may be programmable to increment in response to occurrence of each type of event in a general class of events. For example, the combinatorial counter may be configured to increment in response to occurrence of any cache related events, any flow altering events, or any context related events.

In some configurations the monitoring circuitry is responsive to each of the two or more events having a respective assigned adjustment value, to measure occurrences of each of the two or more events by modifying the combinatorial programmable counter by the respective assigned adjustment value for that event in response to an occurrence of that event. Each of the respective assigned adjustment values for the two or more events may be a different respective assigned adjustment value. In some configurations, at least one of the respective assigned adjustment values may be a negative value. The assignment of a negative value to one of the combinatorial counters may be useful, for example, in ensuring a call depth does not exceed an expected value using a single combinatorial counter. This could be achieved by assigning a respective assigned value of N (e.g., N=1) to an event indicative of a function call and a respective assigned value of minus N (e.g., −1) to a function return.

In some configurations the combinatorial programmable counter is configured to measure a difference in a number of occurrences of the two or more events. In some configurations, the programmable counter is configured to increment in response to a first event and to decrement in response to a second event. For example, where two or more types of events are expected to repeatedly occur together (e.g., in a loop body), the programmable counter could be set up such that the total change in a value of the counter over the loop body is zero. This can be achieved where there is one occurrence of each of two different types of events by incrementing by +1 in response to the first type of event and by −1 in response to the second type of event. Alternatively, different values can be assigned to the counter for each of the two or more types of events. For example, where three different types of events are occurring a value of +1 could be assigned to two of the types of events and a value of −2 could be assigned to the third type of event. In some configurations, the programmable counter may be configured to maintain plural sub-counters, one for each of the types of event, and to calculate an output value using a linear combination of the sub counters. The linear combination may be a sum or a weighted sum of each of the sub-counters.

In some configurations one or more of the plurality of counters may be configured to increment by a value dependent on a relative time between a previous event of the event type assigned to that counter (or instrumentation point) and a current event of the event type assigned to that counter. In other words, rather than incrementing by a value of M in response to the event assigned to the counter, the counter may be configured to increment by a value of M*dt where dt is calculated as a number of cycles (e.g., clock cycles or program counter values) that have occurred between a previous occurrence of that event and the current occurrence of that event. Such an implementation may allow for detection of cases where a sequence of instructions deviates from an expected sequence because an additional instruction (e.g., a non-event triggering instruction) has been executed causing the value of dt that is included in the increment to increase, thereby resulting in the counter reaching a value higher than the expected counter value for that type of event. In some configurations the dependence on relative time can be incorporated through a combination of counters in which one of the counters counts active cycles as the event.

Whilst the events to which the programmable counters are assigned may be fixed for the duration of execution of the sequence of instructions that occurs between the instrumentation points, in some configurations the monitoring circuitry is responsive to the control flow graph identifying sequential event information comprising a sequentially first event and a sequentially second event, to assign a first programmable counter to the sequentially first event and to measure occurrences of the sequentially first event; the sequential event information identifies an expected number of occurrences of the sequentially first event; and the monitoring circuitry is responsive to the predefined action occurring when the sequentially first number of events deviates from the expected number of occurrences of the sequentially first event, to assign a second programmable counter to the sequentially second event and to measure occurrences of the sequentially second event. Such an implementation is of benefit in cases where the nature of the program flow changes between instrumentation points. In some configurations the first programmable counter and the second programmable counter are the same programmable counter. In alternative configurations, the first programmable counter and the second programmable counter may be different programmable counters and the second programmable counter may be initially assigned to count a third type of event with the second programmable counter being reassigned once the first number of events deviates from the first number of expected events. In this way, the first programmable counter can be used to track progress of the sequence of instructions and, as the sequence of instructions progresses, different programmable counters can be assigned to different events that are expected to occur at that stage of the sequence of instructions.

In some configurations the monitoring circuitry is configured to set the predetermined action based on the event information. For example, the event information may indicate that, for a given type of event, if the programmable counter exceeds the expected number of occurrences of the given type of event, then a given predetermined action is to be performed. The given predetermined action may be to assign and/or reassign one or more of the programmable counters.

In some configurations for at least one event identified in the event information the predetermined action comprises raising an exception. By raising an exception in response to the at least one counter deviating from the expected number of occurrences indicated by that counter, an exception handler can be triggered and a notification can be sent to indicate that the sequence of programming instructions has not executed as expected.

In some configurations at least one of the expected number of occurrences comprises an upper expected event count and a lower expected event count, and the supervisor circuitry is configured to determine that the at least one event count has deviated from the at least one of the expected number of occurrences in response to the at least one event count being below the lower expected event count or above the upper expected event count. The upper expected event count and the lower expected event count provide a pair of thresholds (upper and lower) that cause a predetermined action to be performed if the number of occurrences associated with that counter falls outside of the thresholds. In some configurations, at least one of the lower expected event count and the upper expected event count may be zero. In some configurations, at least one of the lower expected event count and the upper expected event count may be modified as one of the predetermined actions performed in response to at least one other counter deviating from the expected number of occurrences. In some configurations a preload value may be assigned as a starting value for the counter may be provided instead of or in addition to the upper and lower expected event counts. Including both an upper and lower threshold allows the programmer or compiler to ensure that the occurrences of a given type of event neither exceed the upper expected event count nor fall below the lower expected event count. In some configurations, the supervisor circuitry is responsive to the count exceeding the upper expected event count to perform a first predetermined action, and the supervisor circuitry is responsive to the count falling below the lower expected event count to perform a second predetermined action different to the first predetermined action.

In some configurations there is provided an apparatus comprising storage circuitry to store information indicative of a sequence of instructions and static analysis circuitry configured to analyse the information indicative of the sequence of instructions. The static analysis circuitry is also configured to generate event information indicative of a plurality of different types of events expected to occur during execution of the sequence of instructions. The event information comprises, for each event of the plurality of different types of events, type information indicating a type of that event and an expected number of occurrences of that event. The static analysis circuitry is configured to define the event information to cause monitoring circuitry to respond to an instrumentation point occurring during execution of the sequence of instructions by assigning at least a subset of a plurality of programmable counters to measure, during execution of the sequence of program instructions, occurrences of the plurality of different types of events identified in the event information, and to trigger the monitoring circuitry to respond to at least one counter of the subset deviating from the expected number of occurrences of the event indicated by that counter, by performing a predetermined action.

The sequence of instructions may be specified by a programmer or a compiler and is analysed by the static analysis circuitry to identify events indicative of that sequence of instructions. In some configurations, the static analysis circuitry may be provided with an indication of a number of available programmable counters and the static analysis circuitry may be configured to restrict the number of events that are identified to the number of available programmable counters. In some configurations, the analysis may be performed using a control flow graph indicative of a plurality of possible paths through the sequence of instructions. In some configurations the event information that is generated may be included as annotation information as part of the control flow graph. Alternatively, the event information may be output as data separate from the control flow graph. The event information is output in a form such that it can be interpreted by the plurality of programmable counters. In some configurations, the event information may be encrypted and/or provided to a secure region of memory that is accessible to the processing circuitry operating in a secure mode and that is inaccessible to the processing circuitry operating in a non-secure mode.

In some configurations the static analysis circuitry is configured to identify two or more events that occur in combination in the sequence of instructions to generate the event information to define a combinatorial event identifying the two or more events to trigger the monitoring circuitry to assign the two or more events to a combinatorial programmable counter of the plurality of counters. The definition of the combinatorial event within the event information is arranged such that, when the event information is interpreted by the monitoring circuitry, the monitoring circuitry is configured to assign a single combinatorial event counter of the programmable event counters to those events.

In some configurations the static analysis circuitry is configured, for each of the two or more events, to define respective assigned adjustment values to cause the monitoring circuitry to measure occurrences of each of the two or more events by modifying the combinatorial programmable counter by the respective assigned adjustment value for that event. Such an approach enables the combinatorial event counter to keep track of the two or more events using a single counter. The respective assigned values for each of the two or more events may be the same value. This may be beneficial, for example, to ensure that a total number of occurrences of a broad class of events, e.g., any cache related events, does not exceed a threshold. Alternatively, one or more of the two or more events may be assigned a respective assigned value different from the other respective assigned values associated with the two or more events.

In some configurations the static analysis circuitry is configured to define at least one of the respective assigned adjustment values as a negative adjustment value. Such an assignment could be used so that a single combinatorial counter can be used to track a difference in the number of occurrences of two or more different events. For example, if two events were always identified as occurring together, then the analysis circuitry may assign a combinatorial event to the two events with a first event of the two events being assigned respective adjustment value of +N and a second event of the two events being assigned a respective adjustment value of −N. Similarly, if the number of events that were identified as occurring together was greater than two, then the respective adjustment values could be selected such that a sum of those respective adjustment values was zero.

In some configurations the static analysis circuitry is responsive to identification of a loop in the sequence of instructions to identify, as the two or more events, two or more events occurring within repeated instructions comprised in the loop. By assigning a combinatorial counter to events that occur in a loop body of a loop, and assigning respective assigned adjustment values such that a sum of those values is zero over one instance of executing instructions in the loop body, the combinatorial event counter would be expected to be zero at the end of the loop body independent of how many iterations of that loop occurred in the sequence of instructions. Such a counter could be used to identify whether the loop body has executed as expected. This could be achieved, for example, by setting a threshold equal to the largest deviation from zero that is expected when only a subset of events of the loop body have occurred.

In some configurations the static analysis circuitry is responsive to identifying a sequentially first event and a sequentially second event that occur in the sequence of instructions to generate the event information: to define sequential event information identifying the sequentially first event and the sequentially second event, and to define an expected number of occurrences of the sequentially first event; and to cause the monitoring circuitry to defer measuring the sequentially second set of events until an assigned counter measuring occurrences of the first event has deviated from the expected number of occurrences of the sequentially first event. By deferring the measurement of the sequentially second set of events until the number of occurrences of the first event has deviated from the second number of occurrences of the sequentially first event, the second counter can initially be used to monitor a different event reducing the total number of counters required. In some configurations, a same counter can be used to measure the number of occurrences of the first event and the second event.

In some configurations the static analysis circuitry is configured to: generate a control flow graph comprising nodes identifying flow altering events corresponding to flow altering instructions in the sequence of instructions and edges identifying non-flow altering events corresponding to non-flow altering instructions in the sequence of instructions; identify a region of the control flow graph to be monitored based on instrumentation points in the sequence of instructions; and generate the event information by collapsing the control flow graph to remove one or more nodes occurring between the instrumentation points. Basing the event information on the collapsed control flow graph reduces the size of the event information and thereby reduces the number of counters required to monitor events during execution of the sequence of instructions.

In some configurations the static analysis circuitry is configured to collapse the control flow graph by: identifying a plurality of possible paths through the control flow graph between the instrumentation points, each of the plurality of possible paths comprising one or more edges; and representing each path of the plurality of possible paths using a reduced number of edges in the control flow graph. In some configurations, collapsing the control flow graph may comprise identifying the types of events associated with the control flow graph, identifying a subset of the types of the events common to each of the plurality of paths, and collapsing the control flow graph by combining edges that are not associated with the subset of the types of events with one or more adjacent edges.

In some configurations the static analysis circuitry is configured to store, a single set of event information for the plurality of possible paths, the single set of event information corresponding to, for each event in the single set of event information, a maximum number of occurrences of that event identified in the plurality of possible paths. As a result, when the program is executed the events that occur will be less than or equal to the maximum number of occurrences independent of which of the plurality of possible paths the program takes on execution. This approach provides a particularly compact set of event data and results in a particularly efficient implementation as the monitoring circuitry is not required to track any details relating to the progress of the sequence of instructions through the control flow graph.

In some configurations the reduced number of edges is a single edge. Collapsing the control flow graph in this way allows for a particularly efficient implementation of the monitoring circuitry because the monitoring circuitry does not need to track progress of the sequence of instructions during execution of the set of instructions.

Particular configurations will now be described with reference to the figures.

FIG. 1 illustrates an apparatus 10 according to various configurations of the present techniques. The apparatus is provided with monitoring circuitry 12 and storage circuitry 16. The storage circuitry 16 is configured to store event information 18. The event information 18 identifies a one or more types of events that are expected to occur in a sequence of programming instructions and, for each of the types of events, an indication of an expected number of occurrences of that type of event. The monitoring circuitry 12 comprises a plurality of programmable counters 14 which can be assigned to count one of the plurality of types of event based on the event information 18. The monitoring circuitry 12 is responsive to an instrumentation point in a sequence of instructions to count a number of occurrences of each of the types of event indicated in the event information 18 that occur between the instrumentation point and a subsequent instrumentation point. The monitoring circuitry 12 is responsive to one of the programmable counters 14 deviating from the expected number of events associated with the type of event to which that programmable counter is assigned, to trigger a predetermined action.

Figure 2:
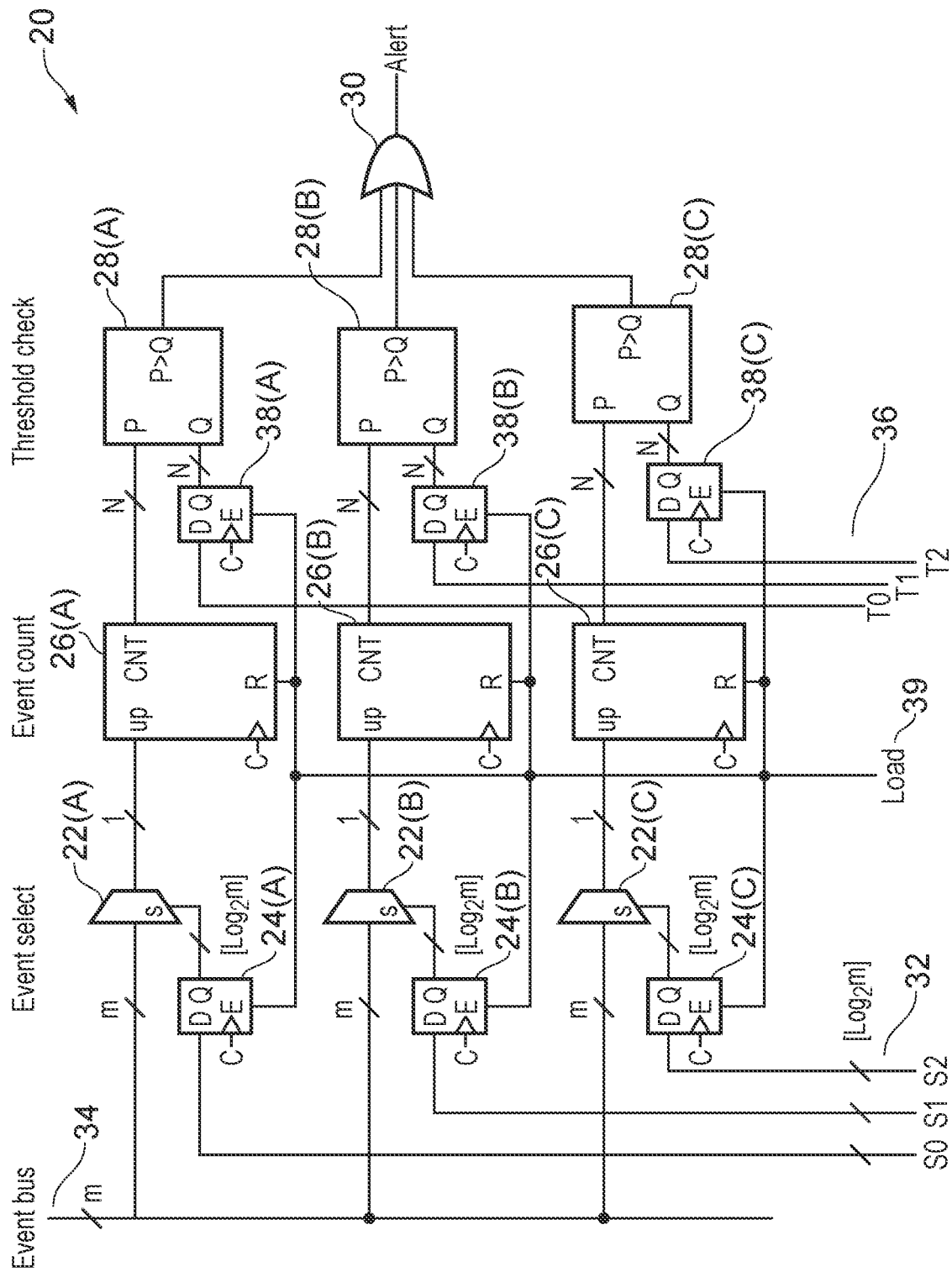
FIG. 2 schematically illustrates an apparatus according to some example configurations of the present techniques.

FIG. 2 schematically illustrates details of monitoring circuitry 20 according to some configurations of the present techniques. The monitoring circuitry 20 comprises a plurality of programmable counters 26. In the illustrated configuration, three programmable counters 26 are illustrated including a first programmable counter 26(A), a second programmable counter 26(B) and a third programmable counter 26(C). In the illustrated configuration, the operation of each of the three programmable counters is the same. Each of the programmable counters 26 in this example is configurable to count occurrences of a single event indicated on the event bus 34. The event bus 34 is an m-bit channel where each of the m-bits is indicative as to whether a different type of event has occurred. The input (labelled "up") to each of the programmable counters 26 is coupled (connected) to the event bus by selection circuitry 22 that selects one of the m-bits of the event bus in dependence on (identified by) a value of the $\log_2 m$ bit signal latched by the D-type latch 24. The N-bit output (labelled "CNT") of each of the plurality of programmable counters is coupled to comparison circuitry 28 which is configured to determine whether or not a threshold associated with that one of the programmable counters 26 has been exceeded.

For each of the plurality of programmable counters 26, the monitoring circuitry 20 is provided with an indication of an event type 32 and a threshold 36 corresponding to each event type. In the illustrated configuration, the counter 26(A) is provided with an event type 32 indicated by the $\log_2(m)$-bit signal S0 and a threshold 36 indicated by the N-bit signal T0; the counter 26(B) is provided with an event type 32 indicated by the $\log_2(m)$-bit signal S1 and a threshold 36 indicated by the N-bit signal T1; and the counter 26(C) is provided with an event type 32 indicated by the $\log_2(m)$-bit signal S2 and a threshold 36 indicated by the N-bit signal T2.

Each of the event types 32 and the thresholds 36 are latched using a D-type latch configured to latch (hold) a value provided at the input ("D") at the output ("Q") and to update that value in response to a load signal 39. When the load signal 39 is high, the D type latch 24 and the D-type latch 38 are enabled and the event type 32 and the threshold 36 are updated in the D type latch 24 and the D type latch 38 respectively. In addition, a current counter value of the programmable counter 26 is reset. When the load signal 39 is pulled low the values in the D type latch 24 and the D type latch 38 are fixed, and so that the programmable counter 26 is able to count occurrences of events.

As discussed, the event type 32 is a $\log_2(m)$-bit signal used by the selection circuitry 22 to select one of the m-bits of the event bus to be passed to the programmable counter 26. If on application of a clock signal at the "C" input of the programmable counter 26, the selected bit of the event bus is high, then the programmable counter 26 increments by 1 and outputs an N-bit value indicative of a current number of occurrences of the event on the event bus 34.

The comparison circuitry 28 compares a first input P, which is output from the programmable counter 26, and a second input Q, which is the latched value of the threshold 36 held by the D type latch 38. The comparison circuitry 28 is arranged to output a value indicative of whether P>Q. The output of the comparison circuitry 28 is fed to the OR gate 30 to trigger a predetermined condition. In the illustrated configuration, the predetermined condition comprises triggering an alert. By changing the values of the event type 32 and the thresholds 36, the three programmable counters 26 can be configured to count different combinations of events on the event bus 34 and to trigger the alert in response to any one of those selected events exceeding a corresponding threshold 36.

As an illustrative example, the event bus may be an 8 bit event bus with each of the 8 bits indicative of a different one of 8 possible events. Each of the 8-bits of the event bus is held at logical zero when no events have occurred. Each time one of the 8 possible events occurs during execution of instructions, that event is signalled on a corresponding bit of the event bus. During execution of an exemplary sequence of instructions, the user/compiler may have provided event data indicating the event to be monitored by this counter: the event to be monitored is identified by S0=[000] identifying that the zeroth bit of the event bus is to be monitored, and T0=[0010] identifying that the threshold number of occurrences is two. By asserting the values of S0 as one of the event types 32, T0 as one of the thresholds 36, and applying a pulse to the load signal 39, the programmable counters 26 are reset and the event types 32 and the thresholds are latched in the D-type latches. Specifically, the value S0=[000] is latched (held) at the output of D-type latch 24(A) and the value T0=[0010] is latched at the output of D-type latch 38(A). As a result the value S0=[000] is applied at the input of selection circuitry 22(A) which responds by routing the zeroth bit of the event bus 34 to the programmable counter 26(A). The programmable counter 26(A) is then responsive to a signal on the zeroth bit of the event bus 34 (i.e., an event bus signal of [0000,0001]) to increment a value of the CNT signal output from the programmable counter 26(A) to the P input of the comparison circuitry 28(A). The comparison circuitry 28(A) therefore receives a number of occurrences of the zeroth event on input P and the threshold T0 on input Q. The comparison circuitry 28(A) outputs a value of logical 0 when P≤Q and a value of 1 when P>Q. As a result, when the event indicated by the zeroth bit of the event bus 34 has occurred 3 times such that the input P of the comparison circuitry 28(A) is equal to [0011], the comparison circuitry outputs a value of 1 which is fed through the OR gate 30 to trigger an alert.

In the above example, the only a single event was identified, in alternative configurations, the event data may indicate any number of events and it the circuitry illustrated in FIG. 2 may be modified to incorporate any number of instances of the counting circuitry. When fewer events are identified than the number of programmable counters, the remaining counters may be disabled using any method known to the skilled person, for example by adding additional selection circuitry between each comparison circuit 28 and the OR gate 30 that is responsive to an indication that a corresponding counter is disabled, to pulls the OR gate input to zero for that counter and that is responsive to an indication that the corresponding counter is enabled to route (couple) the output of the comparison circuitry for the corresponding counter to the OR gate. Furthermore, it would be readily apparent to the skilled person that the choice of 8 bits for the event bus is for exemplary purpose only and, in alternative configurations, any number of bits could be provided for the event bus.

Figure 3:
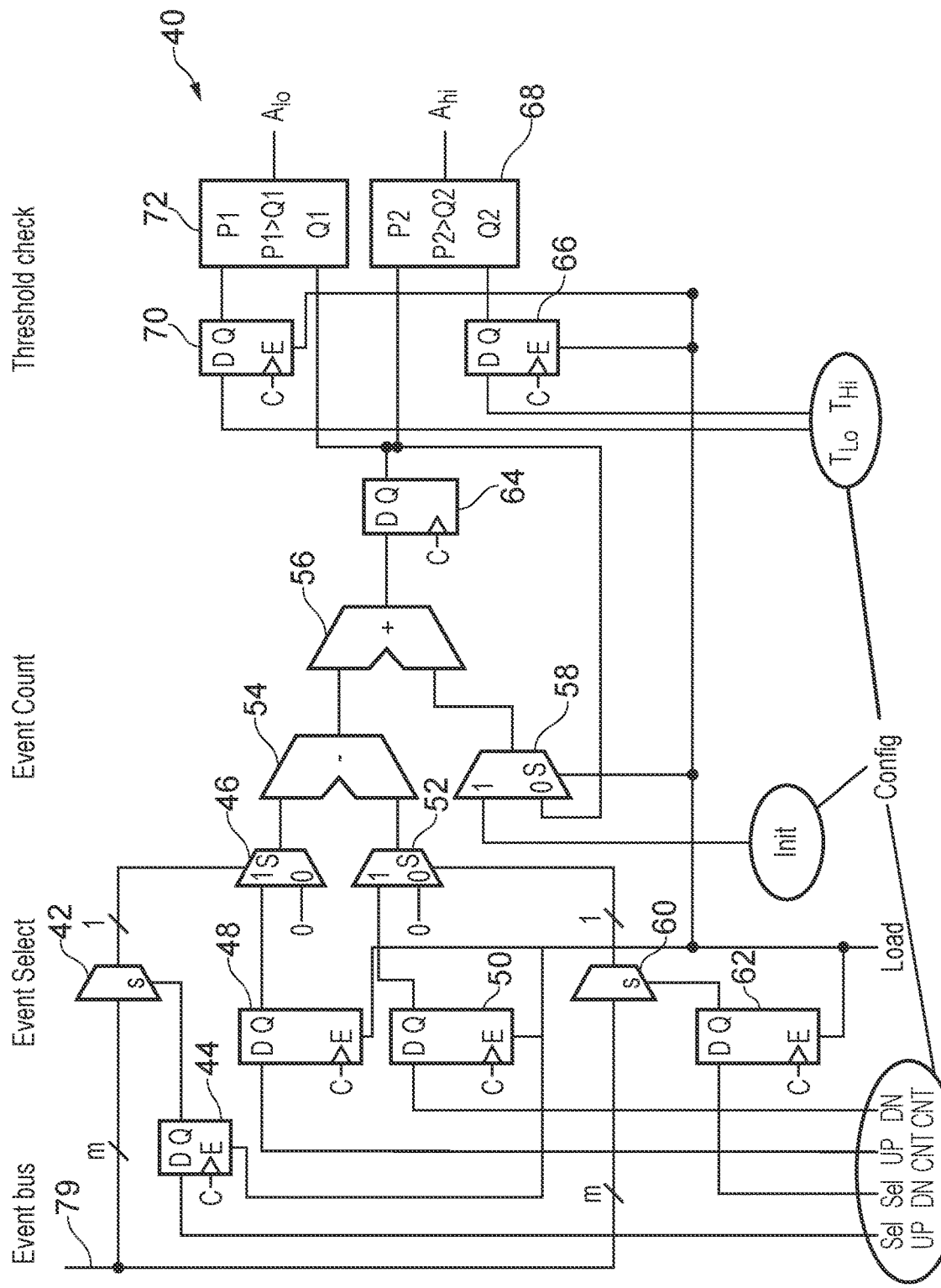
FIG. 3 schematically illustrates an apparatus according to some example configurations of the present techniques.
Figure 4:
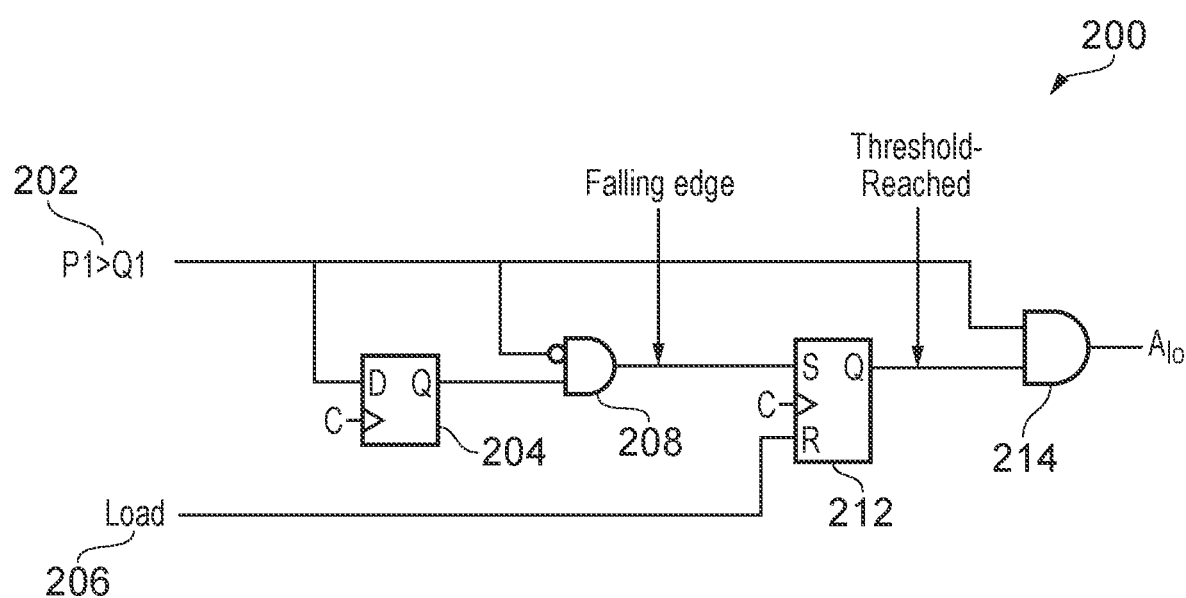
FIG. 4 schematically illustrates an apparatus according to some example configurations of the present techniques.

FIG. 3 schematically illustrates a combinatorial programmable counter 40 that can be programmed as a ratiometric counter that responds to up to two different events on the m-bit event bus 79. The programmable counter 40 comprises an event selection stage, an event counting stage and a threshold checking stage.

In the event selection stage, a first event is selected from the m-bit event bus 79 using the selection circuitry 42. The selection circuitry selects the event from the event bus 79 based on a value of the log $2(m)$-bit "sel UP" signal latched in the D type latch 44. When the first event occurs, it is indicated on a bit of the event bus 79 and is passed (coupled/routed) through selection circuitry 42 to selection circuitry 46. Selection circuitry 46 receives a first input of an "UP CNT" value, latched in the D type latch 48, indicative of a respective value by which the programmable counter 40 should be incremented in response to an occurrence of the event identified by the "sel UP" signal. Selection circuitry 46 receives a second input of zero. When the input "S" of the selection circuitry 46 is a one, the value of "UP CNT" is propagated as a first value to a first input of the subtraction unit 54, and when the input "S" of the selection circuitry 46 is a zero, the value of zero is propagated as the first value to the first input to the subtraction unit 54. Similarly, a second event is selected from the event bus 79 is determined by the log $2(m)$-bit "sel DN" signal latched in the D type latch 62. When the second event occurs, it is indicated on the event bus 79 and passes through the selection circuitry 60 to the selection circuitry 52. Selection circuitry 52 receives a first input of an "DN CNT" value, latched using the D-type latch 50, indicative of a respective value by which the programmable counter 40 should be decremented in response to an occurrence of the event identified by the "sel DN" signal. Selection circuitry 52 receives a second input of zero. When the input "S" of the selection circuitry 52 is a one, the value of "DN CNT" is propagated as a second value to a second input to the subtraction unit 54, and when the input "S" of the selection circuitry 46 is a zero, the value of zero is propagated as the second value to the second input of the subtraction unit 54.

In the event counting stage the first value (either "UP CNT" or zero dependent on whether an event identified by "sel UP" has occurred or not), output from the selection circuit 46, is propagated to a first input of the subtraction unit 54 and the second value (either "DN CNT" or zero dependent on whether an event identified by "sel DN" has occurred or not), output from the selection circuit 52, is propagated to a second input of the subtraction unit 54. The subtraction unit 54 calculates the value of the first input minus the second input and passes the output to the addition circuit 56 which (when the load signal is low) takes a current latched count value, latched in the D type latch 64, as the second input and calculates a new count value by adding the output from the subtraction unit 54 to the current value latched in the D type latch 64. The D type latch 64 stores a current count value which forms an input Q1 of a first comparison circuit 72 and an input P1 of a second comparison circuit 68.

In the threshold check stage, the first comparison circuit 72 also takes an, as a second input P1, a value of a threshold $T_{lo}$ latched in the D type latch 70 and outputs a value indicative of whether P1>Q1. The second comparison circuit 68 also takes, as a second input Q2, a value of a threshold $T_{hi}$ latched in the D type latch 66 and outputs a value indicative of whether P2>Q2. The output $A_{lo}$ from the first comparison circuit 72 takes a value of logical 1 when P1>Q1, i.e., when the value indicated by the programmable counter is less than the low threshold value $T_{lo}$, and logical 0 otherwise. The output Ani from the second comparison circuit 68 takes a value of logical 1 when P2>Q2, i.e., when the value indicated by the programmable counter is more than the high threshold value $T_{hi}$, and zero otherwise.

The programmable counter is also provided with a load signal. When the load signal is high, the D type latch 44, the D type latch 48, the D type latch 50, the D type latch 62, the D type latch 70, and the D type latch 66 are each enabled and will update to a current value of the respective signal at the D input. In addition, the selection circuit 58 is responsive to the load signal being high to select the "Init" signal to be transferred to the addition circuitry 56 resetting the value latched at the D type latch 64 to the value stored in "Init". When the load signal drops low again each of the D type latches switch into the latched mode and retain the value that was present at the D input at the point when the load signal was high.

In some alternative configurations, the output Ab of the first comparison circuit 72 and the output Ani of the second comparison circuit 68 are combined using an OR gate so that an alert (the predetermined action) is triggered when the value indicated by the programmable counter does not fall within the predefined range from $T_{lo}$ up to $T_{hi}$.

As an illustrative example, a programmer or compiler may wish to define a ratiometric counter that counts occurrences of a data read event and a data write event that occur within a loop body. The loop body may be such that two instances of a data read event are expected followed by a single instance of a data write event. In the illustrated configuration, it is assumed that the event bus is an 8 bit event bus (m=8), the data read event is indicated by the 7th bit on the event bus and the data write event is indicated by the 5th bit on the event bus. The compiler/programmer can therefore define a ratiometric counter that increments by 1 in response to each occurrence of the data read event and that decrements by 2 in response to the data write event. As a result, the expected counter progression (for a counter initialised to 0) would follow a pattern of 0, 1, 2, 0, 1, 2, 0, 1, . . . . The programmable counter 40 can be programmed to monitor for deviation from these expected counter values by setting the configuration information (config) to have values: sel UP=[111], UP CNT=[01], sel DN=[101], DN CNT=[10], $T_{lo}$=[0000], and $T_{hi}$=[0010]. When the configuration is loaded, by applying a pulse to the load signal, the counter value is initialised to an Init signal of zero; the value of sel UP is latched (held) at the Q output of D type latch 44 causing the selection circuitry 42 to pass the 7th bit of the event bus to the selection circuitry 46; the value of sel DN is held at the Q output of D type latch 62 causing the selection circuitry 60 to pass the 5th bit of the event bus to the selection circuitry 52; the value of UP CNT is held at the Q output of d type latch 48 and is passed to the selection circuitry 46 so that when the 7th bit of the event bus is asserted (logical 1), the value of UP CNT is passed to the subtraction circuitry 54; and the value of DN CNT is held at the Q output of d type latch 50 causing the selection circuitry 52 so that when the $5^{th}$ bit of the event bus is asserted (logical 1), the value of DN CNT is passed to the subtraction circuitry 54. The subtraction circuitry 54 therefore receives, as a first value, an input of UP CNT from selection circuitry 46 when the $7^{th}$ bit of the event bus is asserted, and zero otherwise, and receives, as a second value, an input of DN CNT from selection circuitry 50 when the $5^{th}$ bit of the event bus is asserted, and zero otherwise. The output of the subtraction circuitry 54 therefore takes one of four values. When neither the $5^{th}$ nor the $7^{th}$ bit of the event bus is asserted, the output of the subtraction circuitry 54 is zero. When both the $5^{th}$ bit and the $7^{th}$ bit of the event bus are asserted, the output of the subtraction circuitry 54 is UP CNT minus DN CNT (in this case 1-2=-1). When the $5^{th}$ bit of the event bus is asserted and the $7^{th}$ bit of the event bus is not asserted, then the output of the subtraction circuitry 54 is minus DN CNT (-2). When the $7^{th}$ bit of the event bus is asserted and the $5^{th}$ bit of the event bus is not asserted then the output of the subtraction circuitry 54 is UP CNT (1). In response to the expected sequence of events (data read event, data read event, data write event), the output of the subtraction circuitry 54 will therefore take a repeated sequence of values+1, +1, -2. The output of the subtraction circuitry is passed to the addition circuitry 56 which adds this value to a previously stored counter value. Because the counter was initialised to zero, when the events occur as expected, the counter value latched by the D type latch 64 will take a repeated sequence of values 0, 1, 2, 0, . . . . The output of the D type latch 64 is then compared against the thresholds $T_{lo}$ and $T_{hi}$ latched in the D type latches 66, 70 using comparison circuitry 72 and comparison circuitry 68 which support twos complement representations of inputs P and Q. If the sequence of occurrences of the data read event and the data write event continues to follow the expected pattern (data read event, data read event, data write event) then the threshold values $T_{lo}$ and $T_{hi}$ will not be passed and no alert will be triggered. If however the executed sequence of instructions was not as expected and the loop body included only one occurrence of the data read event, then the counted value latched in the D type latch 64 would follow the pattern 0, 1, -1, 0, -2 and would quickly fall below the lower threshold $T_{lo}$. As a result, the comparison circuitry 68 would output a signal and trigger an alert.

Figure 5:
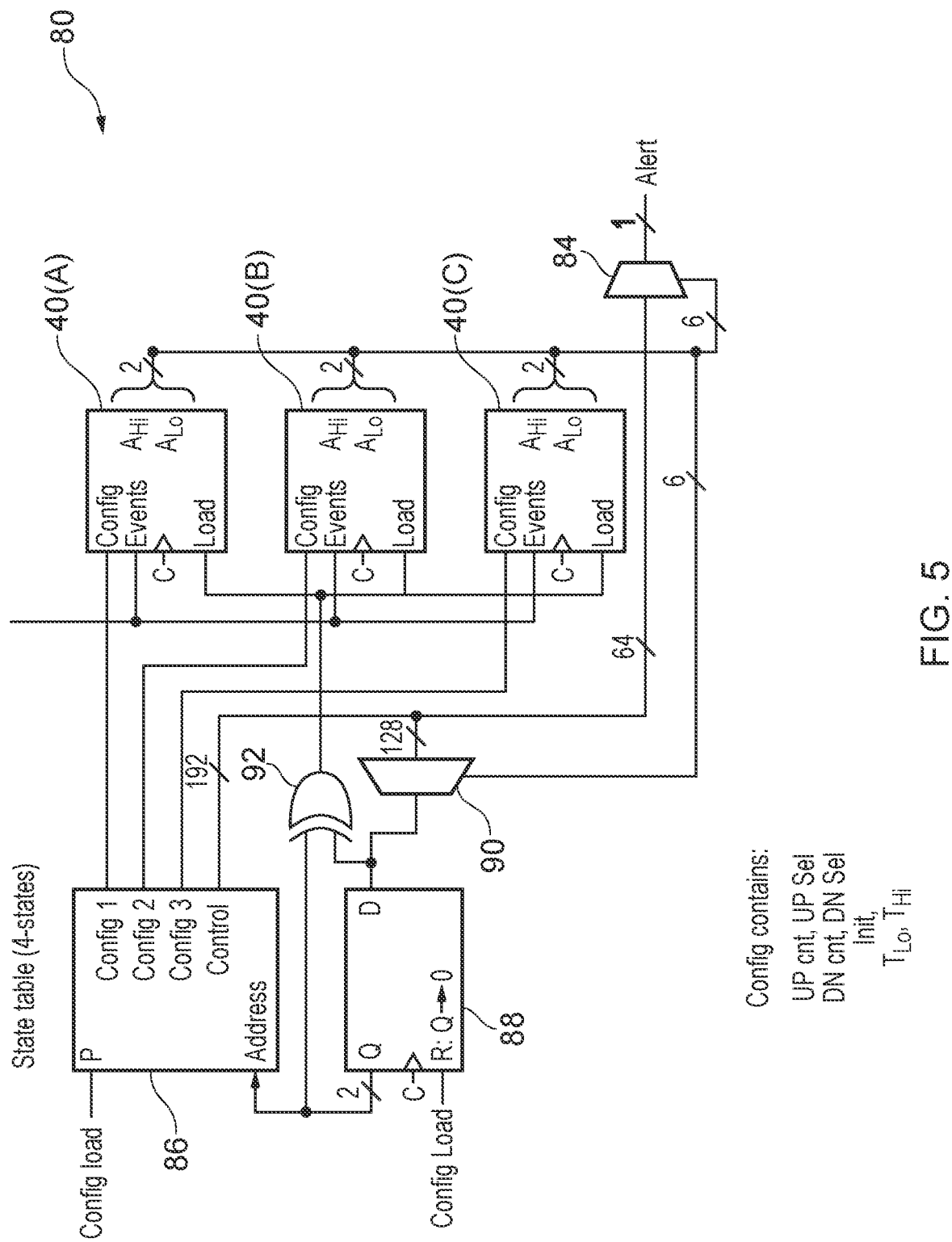
FIG. 5 schematically illustrates an apparatus according to some example configurations of the present techniques.

The comparison circuitry 72 in FIG. 3 is configured to output a value (e.g., logical 1) when P1>Q1, i.e., when the threshold $T_{lo}$ is greater than the counted number of occurrences of the event. FIG. 5 schematically illustrates an additional circuit 200 that could be coupled to the output P1>Q1 of comparison circuitry 72. The purpose of the circuit illustrated in FIG. 5 is to disable the output signal $A_{lo}$ until the counter has first reached the low threshold and then subsequently fallen below it. For example, in some use cases it may be expected that a counter initialised to zero (Init=0) would initially rise to a value (e.g. +4 occurrences) and then remain within a range (e.g., +4 to +6). The circuit illustrated in FIG. 5 could be used to disable the output $A_{lo}$ until the threshold $T_{lo}$ has been crossed, i.e., $A_{lo}$ is disabled until the counter has exceeded $T_{lo}$.

The circuit 200 comprises a D-type latch 204, a first AND gate 208 of which one of the inputs is inverted, an S-type latch 212, and a second AND gate 214. The circuit 200 receives the inputs P1>Q1 202 (output from the comparison circuitry 72) and the load signal 206 used to reset the circuit. The circuit 200 outputs the signal $A_{lo}$ described in relation to FIG. 3. The D-type latch 204 receives the signal P1>Q1 202 at the D input which is latched to the output Q on each clock cycle. The Q output of the D-type latch 204 is coupled to a non-inverting input of the first AND gate 208 along with the signal P1>Q1 202 which is coupled to an inverting input of the first AND gate 208. The first AND gate 208 therefore outputs a logical 1 when a current value of P1>Q1 202 is logic 0 and when a previous value (the value in the previous clock cycle) of P1>Q1 202 was logic 1, i.e., when P1>Q1 was previously true and is now false. In other words, the output of the first AND gate 208 is a logic 1 when there is a falling edge on P1>Q1 202, when the counter moves from below the threshold $T_{lo}$ to above the threshold $T_{lo}$. The falling edge detected signal is latched by the S-type latch 212 such that the Q output of the S-type latch 212 is logical 1 once the threshold $T_{lo}$ has been reached. The output of the S-type latch is coupled to the second AND gate 214 along with the signal P1>Q1 202. The second AND gate 212 therefore outputs a signal $A_{lo}$ when the input signal P1>Q1 202 is true and the threshold is enabled indicating that the condition P1>Q1 has, at some point since the last reset, been false. The circuit 200 is reset by load signal 206 which is fed into the R input of the S-type latch 212.

By way of example, a threshold $T_{lo}$=+4 is given with the counter value (fed to input Q1 of comparator 72) incrementing by +1 in response to occurrences of a particular event and decrementing by −1 in response to a different event (e.g., the read event and the write event discussed in relation to FIG. 3). An expected sequence of occurrences of the read event and write event may be such that the counter takes values 0,1,2,3,4, followed by a loop body in which the counter is expected to follow a sequence of 5,4,5,4, . . . . Whilst the counter 40 illustrated in FIG. 3 could be used with threshold values of $T_{lo}$=0 and $T_{hi}$=5, these threshold values allow the counter to deviate from the expected counter values by up to −4 during the loop body. By coupling the counter 40 to the circuit 200 the low threshold can be disabled until this threshold is initially exceeded, i.e., the counter reaches +4 for the first time enabling the counter to monitor the behaviour of the loop body more closely. In operation, the counter 40 is initialised to zero. At this point the condition P1>Q1 is true (because $T_{lo}$=+4 is greater than the counter value of zero). However, the circuit 200 disables the output $A_{lo}$. If the sequence of instructions executes as expected, the counter will increase to a value of 4 and then alternate between values of +4 and +5. When the counter initially reaches+4, the output P1>Q1 202 will change from logic 1 to logic 0 triggering a falling edge detected signal at the output of the first AND gate 208 which causes an output Q to be latched at the output of the S-type latch 212, thereby enabling the low threshold. The output $A_{lo}$ remains at logic 0 unless the signal P1>Q1 subsequently becomes logic 1 indicating that that counter has dropped below the threshold $T_{lo}$. At this point, both inputs of the second AND gate 214 are high and the output $A_{lo}$ becomes logic 1 triggering a predetermined action.

FIG. 5 schematically illustrates monitoring circuitry 80 according to various configurations of the present techniques. The monitoring circuitry 80 comprises a plurality of programmable counters 4040. The monitoring circuitry 80 comprises control circuitry 86 arranged to maintain a sequence of four possible states each comprising plural sets of configuration information (config 1, config 2, and config 3) for controlling the programmable counters 40. The current operating state of the control circuitry 86 is determined by a two bit addressing value fed into the control circuitry 86.

Each state comprises 192 control bits indicative of predetermined actions to be taken in response to one of the programmable counters 40 deviating from an expected value. The output from the programmable counters 40 comprises 6-bits (2 bits per counter-one bit to indicate an upper threshold has been passed, and a second bit to indicate that a lower threshold has been passed). All of these six bits are fed into the selection circuitry 84 as a selection signal. The selection signal identifies which of the 64 control bits (also passed into selection circuitry 84) should be selected. The selected control bit indicates whether an alarm should be triggered (e.g. 0 meaning no and 1 meaning yes). So for instance, if the bits of the counter were concatenated to produce a selection signal of 001000 (8 in decimal), this would cause control bit 8 to be selected. If control bit 8 was '0' then no alarm would be raised.

An additional 128 control bits can be used to reprogram the counters in a similar way to that described above for specifying whether an alert occurs. In particular, the 6-bits output from the programmable counters are fed into the selection circuitry 90 along with 128 control bits. The 128 control bits are arranged as 64 pairs of bits with each pair of bits identifying one of up to four possible states that can be loaded into the control circuitry 86. The 6-bits output from the programmable counters identifies which of the 64 pairs of bits is to be used to identify the next state. When a new configuration is loaded, the counters are reset using the EXOR circuitry 92 which identifies whether there is a difference between the new state and the existing state (the identifier of which is latched using the D type latch 88) and, if so, triggers a reset of the programmable counters.

The compiler/programmer is therefore able to specify, using the 192 control bits, whether an alert is performed or not for each possible combination of outputs from the programmable counters and/or whether to change an operating state of the control circuitry (i.e., whether to reprogram the reprogrammable counters).

The monitoring circuitry 80 therefore provides three programmable counters 40 that can each be programed to each count a plurality of different events and compare them to a corresponding plurality of lower thresholds and a corresponding plurality of higher thresholds. The monitoring circuitry is responsive to one of the lower or upper thresholds being crossed to trigger an alert to be triggered and/or for the events that are counted by the programmable counter to be modified by modifying the state data that is actively loaded into the configuration circuitry 86.

Figure 6:
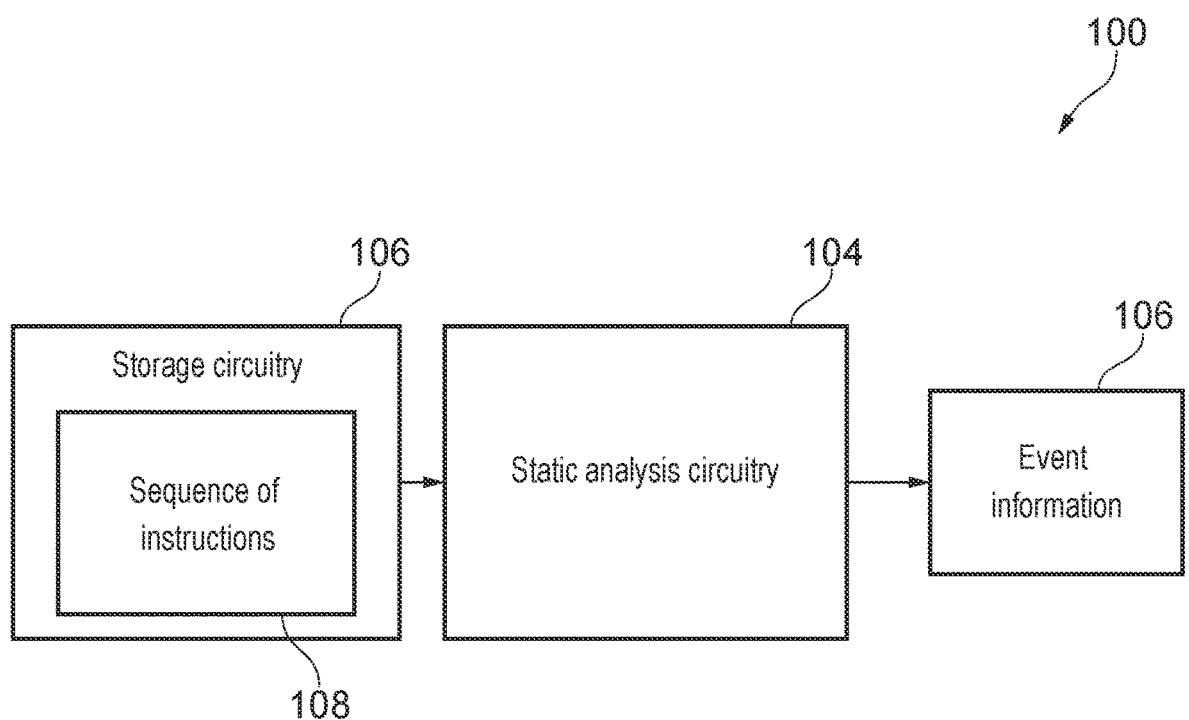
FIG. 6 schematically illustrates an apparatus according to some example configurations of the present techniques.

FIG. 6 schematically illustrates an apparatus 100 according to various configurations of the present technique. The apparatus comprises storage circuitry 106 and static analysis circuitry 104. The storage circuitry 106 stores a sequence of instructions which are passed to the static analysis circuitry 104 for analysis. The static analysis circuitry 104 analyses the sequence of instructions 108 to generate event information 106 indicative of a plurality of event types that are expected to occur during execution of the sequence of instructions 108. The event information also indicates an expected number of occurrences of each of the identified types of event and is in a form that is suitable for passing to monitoring circuitry in order to monitor the sequence of instructions to ensure that the sequence of instructions operates as expected.

Figure 7:
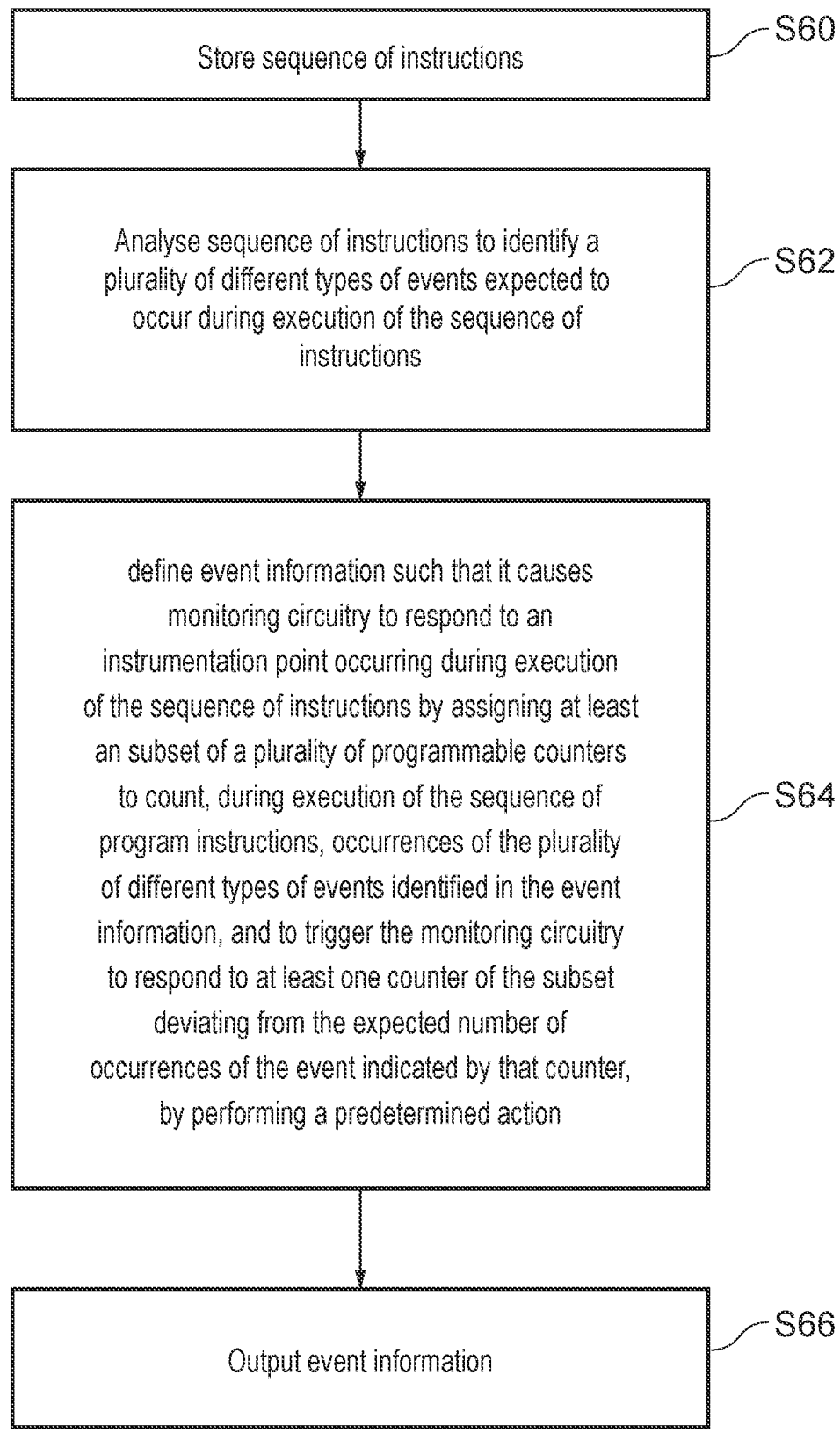
FIG. 7 schematically illustrates a sequence of steps carried out by an apparatus according to some example configurations of the present techniques.

FIG. 7 schematically illustrates a sequence of steps carried out by the apparatus 100 according to various configurations of the present techniques. Flow begins at step S60 where a sequence of instructions are stored by the storage circuitry 106. Flow then proceeds to step S62 where the static analysis circuitry 104 analyses the sequence of instructions to identify a plurality of different types of events that are expected to occur during execution of the sequence of instructions. The events may be determined, for example, from a control flow graph indicative of a plurality of paths through the sequence of instructions. Flow then proceeds to step S64 where event information is defined such that the event information causes monitoring circuitry to respond to an instrumentation point occurring during execution of the sequence of instructions by assigning at least a subset of a plurality of programmable counters to count, during execution of the sequence of program instructions, occurrences of the plurality of different types of events identified in the event information, and to trigger the monitoring circuitry to respond to at least one counter of the subset deviating from the expected number of occurrences of the event indicated by that counter, by performing a predetermined action. Flow then proceeds to step S66, where the event information is output.

Figure 8:
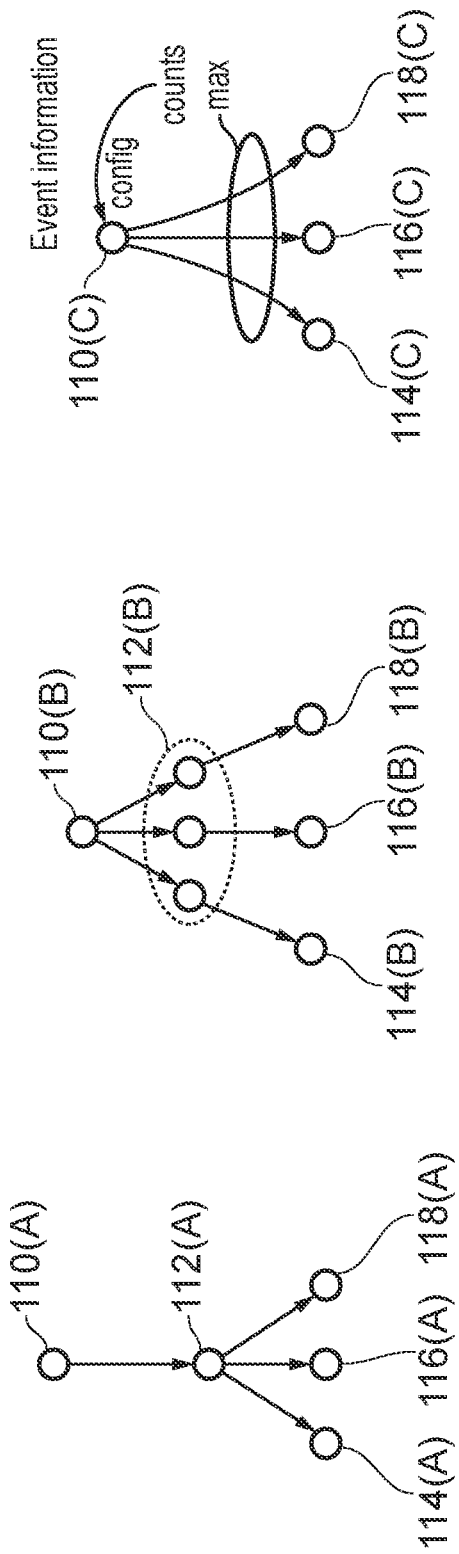
FIG. 8 schematically illustrates collapsing of a control flow graph according to some example configurations of the present techniques.

FIG. 8 schematically illustrates the collapsing of a control flow graph to determine event information for a sequence of program instructions represented by that graph. The left hand control flow graph represents an initial control flow graph beginning at a node 110(A). The nodes of the control flow graph represent flow altering events and/or the start/end of the control flow graph, and are connected by edges each representing one or more non-flow altering instructions. Both the nodes of the control flow graph and the edges of the control flow graph may have events associated with them. The first node 110(A) of the initial control flow graph is connected by a single edge to a second node 112(A). The second node 112(A) represents a branch point (corresponding to a plurality of branch instructions) which is connected by subsequent edges to each of nodes 114(A), 116(A), and 118(A). Flow through the control flow graph can therefore take one of three possible non-branched paths: node 110 (A)—node 112(A)—node 114(A); node 110(A)—node 112 (A)—node 116(A); and node 110(A)—node 112(A)—node 118(A). The control flow graph is collapsed by first splitting the initial control flow graph into an intermediate control flow graph (illustrated in the middle diagram) in which the node 112(A) is split into three nodes 112(B). Then event information is generated by counting occurrences of events associated with each path so that it can be determined how many events would occur if, during execution, that path was taken. Finally, the event information is derived by taking a maximum of the counts associated with each of the plurality of non-branched paths that are illustrated in the middle diagram.

Figure 9:
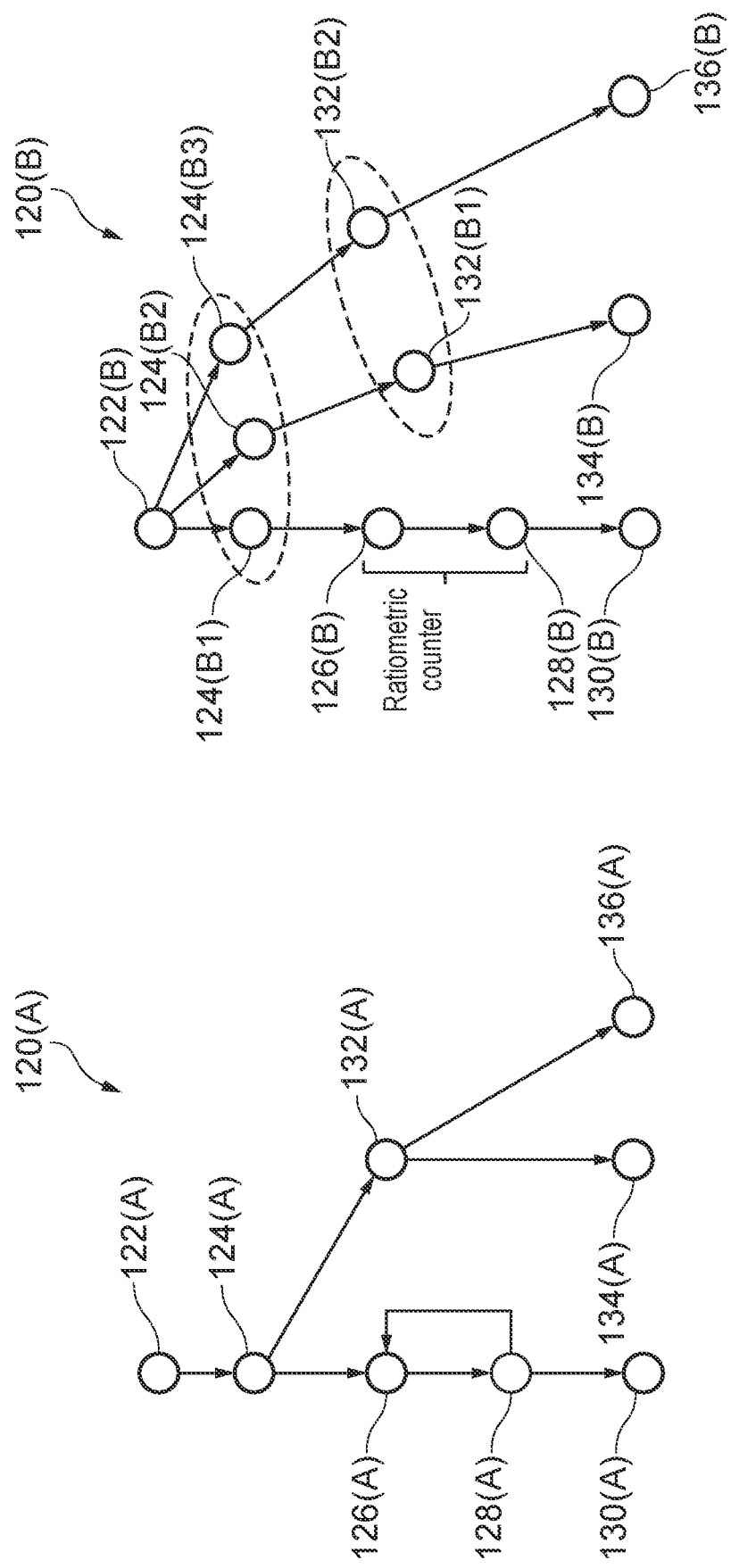
FIG. 9 schematically illustrates collapsing of a control flow graph according to some example configurations of the present techniques.

FIG. 9 schematically illustrates a further example of collapsing a control flow graph to determine event information for a sequence of program instructions represented by that graph. The initial control flow graph 120(A) comprises a sequence of nodes 122(A), 124(A), 126(A), 128(A), 130(A), 132(A), 134(A), and 136(A) connected by a sequence of edges. The initial node 122(A) is connected to node 124(A) by a single edge. The node 124(A) represents a branch point and is connected to node 126(A) by a first edge and to node 132(A) by a second edge. Node 126(A) is connected to node 128(A) by a first edge and a second edge. Nodes 126(A) and 128(A) and their connecting edges therefore represent a loop. Node 128(A) is also connected to node 130(A) by a single edge. Node 132(A) is connected to node 134(A) by a first edge and to node 136(A) by a second edge. There are therefore a plurality of paths that can be traversed starting from node 122(A) comprising: node 122(A)—node 124(A)—node 132(A)—node 134(A); node 122(A)—node 124(A)—node 132(A)—node 136(A); and node 122(A)—node 124(A)—node 126(A)—node 128(A)—(and, until a condition is met, repeating node 126(A)—128(A))—node 130(A). Collapsed control flow graph 120(B) illustrates the paths present in the initial control flow graph broken down into a series of non-branching paths. In particular, the non-branching paths include node 122(B)—node 124(B2)—node 132(B1)—node 134(B); node 122(B)—node 124 (B3)—node 132(B2)—node 136(B) where node 124(A) has been split into three nodes (node 124(B1), node 124(B2), and node 124(B3)), and node 132(A) has been split into two nodes (node 132(B1) and node 132(B2)). The non-branching paths also include node 122(B)—node 124(B1) 0—node 126(B)—node 128(B)—node 130(B), where the collapsed control flow graph has been annotated by the analysis circuitry to include event data indicating that a ratiometric counter (for example, implemented using the programmable counter 40 illustrated in FIG. 3) should be used for counting events occurring on the portion of the path between nodes 126(B) and 128(B). The event information associated with the control flow graph can then be determined as in FIG. 8 with the maximum of the values for each event being collected and stored as the event information.

Figure 10:
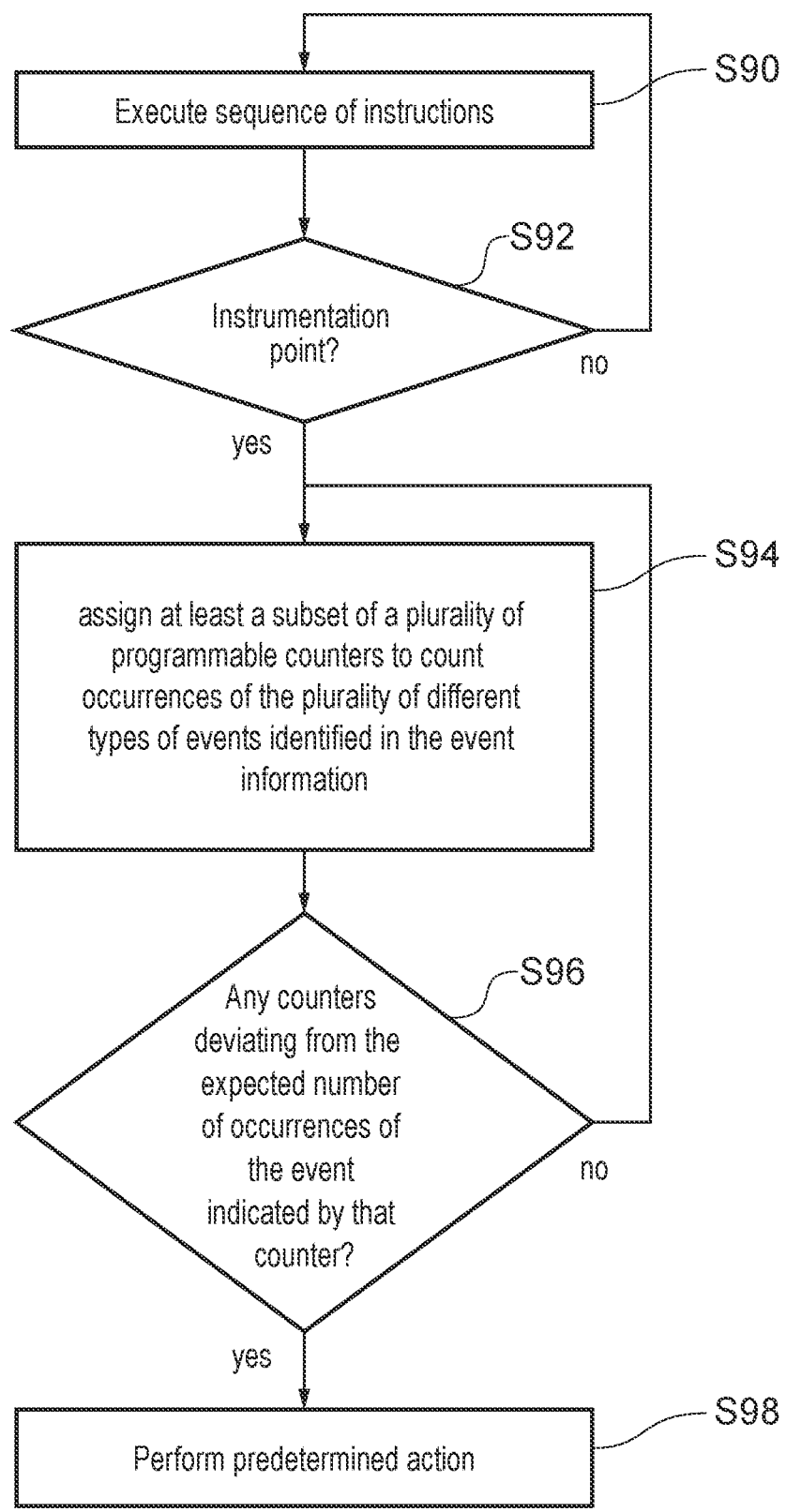
FIG. 10 schematically illustrates a sequence of steps carried out according to some example configurations of the present techniques.

FIG. 10 schematically illustrates a sequence of steps carried out by an apparatus according to various examples of the present techniques—for monitoring events in a sequence of instructions. Flow begins at step S90 where a sequence of instructions are executed. Flow then proceeds to step S92 where it is determined if an instrumentation point has been encountered in a current instruction. If, at step S92, it is determined that no instrumentation point has been encountered then flow returns to step S90. If, at step S92, it is determined that an instrumentation point has been encountered, then flow proceeds to step S94. At step S94, at least a subset of a plurality of programmable counters are assigned to count occurrences of different types of events identified in the event information. Flow then proceeds to step S96 where it is determined if there are any counters deviating from the expected number of occurrences of the event indicated by that counter. If, at step S96, it is determined that there are not such deviations then flow returns to step S94. If, at step S96, it is determined that there is one or more occurrences of an event that deviate from the expected number of occurrences then flow proceeds to step S98 where a predetermined action is performed.

Figure 11:
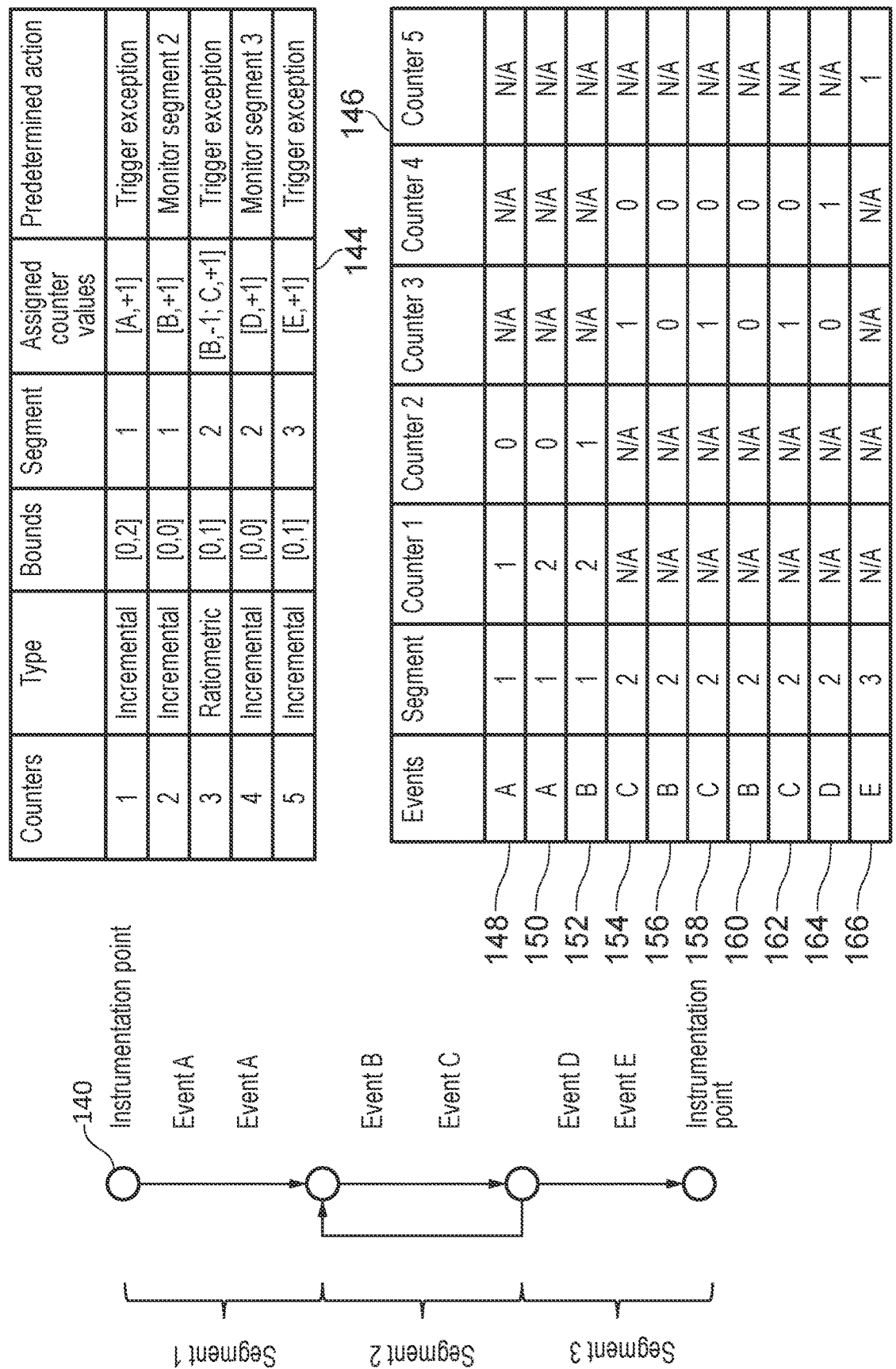
FIG. 11 schematically illustrates a sequence of events between instrumentation points.

FIG. 11 schematically illustrates a path taken by a sequence of program instructions when executed 140. The sequence of program instructions 140 comprises an instrumentation point, an edge comprising two occurrences of an event (event A), a node representing a loop head followed by a loop body containing two events (event B and event C), a node representing a loop tail that loops back to join the loop head such that events B and C are repeated on each iteration of the loop, and an edge comprising two events (event D and event E) connecting the loop tail to a second instrumentation point. The flow is split into three segments: segment 1 comprises the flow from the instrumentation point to the loop head; segment 2 comprises the loop head, the loop body, and the loop tail, and segment 3 comprises the flow from the loop tail to the second instrumentation point.

The sequence of instructions is accompanied by event information 144. The event information stores information defining a plurality of events to be counted. In particular, the event information 144 defines, for each counter, a type of the counter, the bounds that the counter is expected to remain within, segment information indicating a segment of the sequence of instructions 140 corresponding to that counter, assigned counter values indicating how the counter should be modified in response to different events, and a predetermined action that is to be performed if the bounds are exceeded. The event information 144 is derived prior to execution of the sequence of instructions 140 using analysis circuitry described above. The event information 144 identifies events that are to be counted using five counters in order to maintain an indication of occurrences of the events A, B, C, D, and E. Counter 1 is an incremental counter with bounds of [0,2] indicating a lower threshold of zero occurrences and an upper threshold of two occurrences, counter 1 is active during segment 1 and increments by 1 when event A is observed on the event bus, if the bounds identified for counter 1 are exceeded then an exception is triggered. Counter 2 is an incremental counter with bounds of [0,0] indicating a lower threshold of zero occurrences and an upper threshold of zero occurrences such that any occurrence of event B whilst in segment 1 will trigger the predetermined action, it is active during segment 1 and increments by 1 when event B is observed on the event bus, if the bounds identified for counter 2 are exceeded then the monitoring circuitry is configured to move onto monitoring using counters assigned to segment 2. Counter 3 is a ratiometric counter with bounds of [0,1] indicating a lower threshold of zero occurrences and an upper threshold of one occurrence, it is active during segment 2, decrements by 1 when B is observed on the event bus and increments by 1 when event C is observed on the event bus, if the bounds identified for counter 3 are exceeded then an exception is triggered. Counter 4 is an incremental counter with bounds of [0,0] indicating a lower threshold of zero occurrences and an upper threshold of zero occurrences indicating that any occurrence of event D whilst traversing segment 2 will trigger the predetermined action, it is active during segment 2 and increments by 1 when event D is observed on the event bus, if the bounds identified for counter 4 are exceeded then an the monitoring circuitry is configured to move onto monitoring counters assigned to segment 3. Counter 5 is an incremental counter with bounds of [0,1] indicating a lower threshold of zero occurrences and an upper threshold of one occurrence, it is active during segment 3 and increments by 1 when event E is observed on the event bus, if the bounds identified for counter 2 are exceeded then an exception is triggered.

FIG. 11 also illustrates counter information 146 indicating the counter values maintained for each of the values of the counters as the sequence of instructions progresses. The counter information 146 is illustrated for each event that occurs during the sequence. A counter value of N/A indicates that the counter is not assigned during that segment.

The monitoring circuitry begins monitoring at the first instrumentation point and records that the sequence of instructions is expected to be receiving events during segment 1. The monitoring circuitry can assign, based on the event information 144, counter 1 to count occurrences of event A and counter 2 to count occurrences of event B.

As indicated in a first row 148 of the counter information 146, event A is indicated on the event bus during execution of the sequence of instructions 140. The monitoring circuitry records a value of +1 against counter 1. Counter 2 retains a value of 0. The value of counter 1 is within the indicated bounds so no predetermined action is triggered in response to this event.

As indicated in row 150 of the counter information 146, another occurrence of event A is indicated on the event bus during execution of the sequence of instructions 140. The monitoring circuitry increments counter 1 to a value of +2. Counter 2 retains a value of 0. The value of counter 1 is within the indicated bounds so no predetermined action is triggered in response to this event.

As indicated in row 152 of the counter information 146, an occurrence of event B is indicated on the event bus during execution of the sequence of instructions 140. The monitoring circuitry increments counter 2 to a value of +1. Counter 1 retains a value of +2. The value of counter 2 is outside of the indicated bounds so the monitoring circuitry triggers the predetermined action associated with counter 2 which causes the monitoring circuitry to reallocate the programmable counters to monitor events that are assigned to segment 2—by allocating ratiometric counter 3 and incremental counter 4 which are initialised to a value of zero.

As indicated in row 154 of the counter information 146, an occurrence of event C is indicated on the event bus during execution of the sequence of instructions 140. Because the monitoring circuitry has allocated programmable counters to monitor events that occur in segment 2, the counter values of counters 3 and 4 have been set (initialised) to zero during counter allocation. The monitoring circuitry is responsive to the occurrence of event C, to increment counter 3 to a value of +1. Counter 4 retains a value of zero. The value of counter 3 is inside the indicated bounds so no predetermined action is triggered in response to this event.

As indicated in row 156 of the counter information 146, an occurrence of event B is indicated on the event bus during execution of the sequence of instructions 140. The monitoring circuitry decrements counter 3 to a value of 0. Counter 4 retains a value of zero. The value of counter 3 is inside the indicated bounds so no predetermined action is triggered in response to this event.

As indicated in row 158 of the counter information 146, an occurrence of event C is indicated on the event bus during execution of the sequence of instructions 140. The monitoring circuitry increments counter 3 to a value of +1. Counter 4 retains a value of zero. The value of counter 3 is inside the indicated bounds so no predetermined action is triggered in response to this event.

As indicated in row 160 of the counter information 146, an occurrence of event B is indicated on the event bus during execution of the sequence of instructions 140. The monitoring circuitry decrements counter 3 to a value of 0. Counter 4 retains a value of zero. The value of counter 3 is inside the indicated bounds so no predetermined action is triggered in response to this event.

As indicated in row 162 of the counter information 146, an occurrence of event C is indicated on the event bus during execution of the sequence of instructions 140. The monitoring circuitry increments counter 3 to a value of +1. Counter 4 retains a value of zero. The value of counter 3 is inside the indicated bounds so no predetermined action is triggered in response to this event.

As indicated in row 164 of the counter information 146, an occurrence of event D is indicated on the event bus during execution of the sequence of instructions 140. The monitoring circuitry increments counter 4 to a value of +1. Counter 4 retains a value of zero. The value of counter 4 is outside of the indicated bounds so the monitoring circuitry triggers the predetermined action associated with counter 4 which causes the monitoring circuitry to reallocate the programmable counters to monitor events in segment 3 by allocating incremental counter 5 which is initialised to zero.

As indicated in row 166 of the counter information 146, an occurrence of event E is indicated on the event bus during execution of the sequence of instructions 140. Because the monitoring circuitry has allocated programmable counters to monitor events that occur in segment 3, the counter values of counter 5 has been set (initialised) to zero during counter allocation. The monitoring circuitry is responsive to the occurrence of event E, to increment counter 5 to a value of +1. The value of counter 5 is inside the indicated bounds so no predetermined action is triggered in response to this event.

The sequence of instructions then arrives at the next instrumentation point and the monitoring circuitry ceases monitoring the sequence of instructions. It would be readily apparent to the skilled person that other sequence of instructions are possible and different events and counters could each be assigned to represent the different sequences of instructions.

It would be readily apparent to the skilled person that there are several methods by which the instrumentation points could be detected. For example, in some configuration the instrumentation logic is embedded within a binary representing the sequence of instructions. In some configurations the instrumentation points can be determined using a lookup, for example, based on a program counter value, in an external control flow graph. In further configurations, a hybrid approach may be used, e.g., using the Ball and Larus method.

In brief overall summary there is provided an apparatus and method, the apparatus comprising storage circuitry to store event information associated with instructions occurring between instrumentation points. The event information indicates a plurality of different types of events expected to occur during execution of the instructions. The event information comprises, for each event, type information indicating a type of that event and an expected number of occurrences of that event. The apparatus is also provided with monitoring circuitry comprising a plurality of programmable counters. The monitoring circuitry is responsive to a start instrumentation point, to assign at least a subset of the plurality of programmable counters to measure, during execution of the program instructions, occurrences of the plurality of different types of events identified in the event information. The monitoring circuitry is responsive to at least one counter deviating from the expected number of occurrences indicated by that counter, to perform a predetermined action.

Some configurations of the present techniques are described by following numbered clauses:

Clause 1. An apparatus comprising:
storage circuitry configured to store event information associated with a sequence of instructions occurring between instrumentation points, the event information indicative of a plurality of different types of events expected to occur during execution of the sequence of instructions, wherein the event information comprises, for each event of the plurality of different types of events, type information indicating a type of that event and an expected number of occurrences of that event; and
monitoring circuitry comprising a plurality of programmable counters, the monitoring circuitry responsive to a start instrumentation point of the instrumentation points, to assign at least a subset of the plurality of programmable counters to measure, during execution of the sequence of program instructions, occurrences of the plurality of different types of events identified in the event information, wherein the monitoring circuitry is responsive to at least one counter of the subset deviating from the expected number of occurrences of the event indicated by that counter, to perform a predetermined action.

Clause 2. The apparatus of clause 1, wherein:
the plurality of programmable counters comprises a combinatorial programmable counter; and
the monitoring circuitry is responsive to the event information identifying a combinatorial event comprising two or more events of the plurality of different types of event, to assign the combinatorial programmable counter to the two or more events.

Clause 3. The apparatus of clause 2, wherein the monitoring circuitry is responsive to each of the two or more events having a respective assigned adjustment value, to measure occurrences of each of the two or more events by modifying the combinatorial programmable counter by the respective assigned adjustment value for that event in response to an occurrence of that event.

Clause 4. The apparatus of clause 2 or clause 3, wherein the combinatorial programmable counter is configured to measure a difference in a number of occurrences of the two or more events.

Clause 5. The apparatus of any preceding clause, wherein:
the monitoring circuitry is responsive to the control flow graph identifying sequential event information comprising a sequentially first event and a sequentially second event, to assign a first programmable counter to the sequentially first event and to measure occurrences of the sequentially first event;
the sequential event information identifies an expected number of occurrences of the sequentially first event; and
the monitoring circuitry is responsive to the predefined action occurring when the sequentially first number of events deviates from the expected number of occurrences of the sequentially first event, to assign a second programmable counter to the sequentially second event and to measure occurrences of the sequentially second event.

Clause 6. The apparatus of any preceding clause, wherein the monitoring circuitry is configured to set the predetermined action based on the event information.

Clause 7. The apparatus of any preceding clause, wherein for at least one event identified in the event information the predetermined action comprises raising an exception.

Clause 8. The apparatus of any preceding clause, wherein at least one of the expected number of occurrences comprises an upper expected event count and a lower expected event count, and the supervisor circuitry is configured to determine that the at least one event count has deviated from the at least one of the expected number of occurrences in response to the at least one event count being below the lower expected event count or above the upper expected event count.

Clause 9. An apparatus comprising:
storage circuitry to store information indicative of a sequence of instructions; and
static analysis circuitry configured to analyse the information indicative of the sequence of instructions to generate event information indicative of a plurality of different types of events expected to occur during execution of the sequence of instructions, wherein the event information comprises, for each event of the plurality of different types of events, type information indicating a type of that event and an expected number of occurrences of that event,
wherein the static analysis circuitry is configured to define the event information to cause monitoring circuitry to respond to an instrumentation point occurring during execution of the sequence of instructions by assigning at least a subset of a plurality of programmable counters to measure, during execution of the sequence of program instructions, occurrences of the plurality of different types of events identified in the event information, and to trigger the monitoring circuitry to respond to at least one counter of the subset deviating from the expected number of occurrences of the event indicated by that counter, by performing a predetermined action.

Clause 10. The apparatus of clause 9, wherein the static analysis circuitry is configured to identify two or more events that occur in combination in the sequence of instructions to generate the event information to define a combinatorial event identifying the two or more events to trigger the monitoring circuitry to assign the two or more events to a combinatorial programmable counter of the plurality of counters.

Clause 11. The apparatus of clause 10, wherein the static analysis circuitry is configured, for each of the two or more events, to define respective assigned adjustment values to cause the monitoring circuitry to measure occurrences of each of the two or more events by modifying the combinatorial programmable counter by the respective assigned adjustment value for that event.

Clause 12. The apparatus of clause 11, wherein the static analysis circuitry is configured to define at least one of the respective assigned adjustment values as a negative adjustment value.

Clause 13. The apparatus of clause 12, wherein the static analysis circuitry is responsive to identification of a loop in the sequence of instructions to identify, as the two or more events, two or more events occurring within repeated instructions comprised in the loop.

Clause 14. The apparatus of any of clause 9 to clause 13, wherein the static analysis circuitry is responsive to identifying a sequentially first event and a sequentially second event that occur in the sequence of instructions to generate the event information:
to define sequential event information identifying the sequentially first event and the sequentially second event, and to define an expected number of occurrences of the sequentially first event; and
to cause the monitoring circuitry to defer measuring the sequentially second set of events until an assigned counter measuring occurrences of the first event has deviated from the expected number of occurrences of the sequentially first event.

Clause 15. The apparatus of any of clauses 11 to 14, wherein the static analysis circuitry is configured to:
generate a control flow graph comprising nodes identifying flow altering events corresponding to flow altering instructions in the sequence of instructions and edges identifying non-flow altering events corresponding to non-flow altering instructions in the sequence of instructions;
identify a region of the control flow graph to be monitored based on instrumentation points in the sequence of instructions; and
generate the event information by collapsing the control flow graph to remove one or more nodes occurring between the instrumentation points.

Clause 16. The apparatus of clause 15, wherein the static analysis circuitry is configured to collapse the control flow graph by:
identifying a plurality of possible paths through the control flow graph between the instrumentation points, each of the plurality of possible paths comprising one or more edges; and
representing each path of the plurality of possible paths using a reduced number of edges in the control flow graph.

Clause 17. The apparatus of clause 16, wherein the static analysis circuitry is configured to store, a single set of event information for the plurality of possible paths, the single set of event information corresponding to, for each event in the single set of event information, a maximum number of occurrences of that event identified in the plurality of possible paths.

Clause 18. The apparatus of any of clauses 16 to 17, wherein the reduced number of edges is a single edge.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative configurations of the invention have been described in detail herein with reference to the accompanying drawings, it is to be understood that the invention is not limited to those precise configurations, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus comprising:
storage circuitry configured to store event information associated with a sequence of instructions occurring between instrumentation points, the event information indicative of a plurality of different types of events expected to occur during execution of the sequence of instructions, wherein the event information comprises, for each event of the plurality of different types of events, type information indicating a type of that event and an expected number of occurrences of that event; and
monitoring circuitry comprising a plurality of programmable counters, the monitoring circuitry responsive to a start instrumentation point of the instrumentation points, to assign at least a subset of the plurality of programmable counters to measure, during execution of the sequence of program instructions, occurrences of the plurality of different types of events identified in the event information, wherein the monitoring circuitry is responsive to at least one counter of the subset deviating from the expected number of occurrences of the event indicated by that counter, to perform a predetermined action.

2. The apparatus of claim 1, wherein:
the plurality of programmable counters comprises a combinatorial programmable counter; and
the monitoring circuitry is responsive to the event information identifying a combinatorial event comprising two or more events of the plurality of different types of event, to assign the combinatorial programmable counter to the two or more events.

3. The apparatus of claim 2, wherein the monitoring circuitry is responsive to each of the two or more events having a respective assigned adjustment value, to measure occurrences of each of the two or more events by modifying the combinatorial programmable counter by the respective assigned adjustment value for that event in response to an occurrence of that event.

4. The apparatus of claim 2, wherein the combinatorial programmable counter is configured to measure a difference in a number of occurrences of the two or more events.

5. The apparatus of claim 1, wherein:
the monitoring circuitry is responsive to the control flow graph identifying sequential event information comprising a sequentially first event and a sequentially second event, to assign a first programmable counter to the sequentially first event and to measure occurrences of the sequentially first event;
the sequential event information identifies an expected number of occurrences of the sequentially first event; and
the monitoring circuitry is responsive to the predefined action occurring when the sequentially first number of events deviates from the expected number of occurrences of the sequentially first event, to assign a second programmable counter to the sequentially second event and to measure occurrences of the sequentially second event.

6. The apparatus of claim 1, wherein the monitoring circuitry is configured to set the predetermined action based on the event information.

7. The apparatus of claim 1, wherein for at least one event identified in the event information the predetermined action comprises raising an exception.

8. The apparatus of claim 1, wherein at least one of the expected number of occurrences comprises an upper expected event count and a lower expected event count, and the supervisor circuitry is configured to determine that the at least one event count has deviated from the at least one of the expected number of occurrences in response to the at least one event count being below the lower expected event count or above the upper expected event count.

9. An apparatus comprising:
storage circuitry to store information indicative of a sequence of instructions; and
static analysis circuitry configured to analyse the information indicative of the sequence of instructions to generate event information indicative of a plurality of different types of events expected to occur during execution of the sequence of instructions, wherein the event information comprises, for each event of the plurality of different types of events, type information indicating a type of that event and an expected number of occurrences of that event,
wherein the static analysis circuitry is configured to define the event information to cause monitoring circuitry to respond to an instrumentation point occurring during execution of the sequence of instructions by assigning at least a subset of a plurality of programmable counters to measure, during execution of the sequence of program instructions, occurrences of the plurality of different types of events identified in the event information, and to trigger the monitoring circuitry to respond to at least one counter of the subset deviating from the expected number of occurrences of the event indicated by that counter, by performing a predetermined action.

10. The apparatus of claim 9, wherein the static analysis circuitry is configured to identify two or more events that occur in combination in the sequence of instructions to generate the event information to define a combinatorial event identifying the two or more events to trigger the monitoring circuitry to assign the two or more events to a combinatorial programmable counter of the plurality of counters.

11. The apparatus of claim 10, wherein the static analysis circuitry is configured, for each of the two or more events, to define respective assigned adjustment values to cause the monitoring circuitry to measure occurrences of each of the two or more events by modifying the combinatorial programmable counter by the respective assigned adjustment value for that event.

12. The apparatus of claim 11, wherein the static analysis circuitry is configured to define at least one of the respective assigned adjustment values as a negative adjustment value.

13. The apparatus of claim 12, wherein the static analysis circuitry is responsive to identification of a loop in the sequence of instructions to identify, as the two or more events, two or more events occurring within repeated instructions comprised in the loop.

14. The apparatus of claim 9, wherein the static analysis circuitry is responsive to identifying a sequentially first event and a sequentially second event that occur in the sequence of instructions to generate the event information:
to define sequential event information identifying the sequentially first event and the sequentially second event, and to define an expected number of occurrences of the sequentially first event; and
to cause the monitoring circuitry to defer measuring the sequentially second set of events until an assigned counter measuring occurrences of the first event has deviated from the expected number of occurrences of the sequentially first event.

15. The apparatus of claim 11, wherein the static analysis circuitry is configured to:
generate a control flow graph comprising nodes identifying flow altering events corresponding to flow altering instructions in the sequence of instructions and edges identifying non-flow altering events corresponding to non-flow altering instructions in the sequence of instructions;
identify a region of the control flow graph to be monitored based on instrumentation points in the sequence of instructions; and
generate the event information by collapsing the control flow graph to remove one or more nodes occurring between the instrumentation points.

16. The apparatus of claim 15, wherein the static analysis circuitry is configured to collapse the control flow graph by:
identifying a plurality of possible paths through the control flow graph between the instrumentation points, each of the plurality of possible paths comprising one or more edges; and
representing each path of the plurality of possible paths using a reduced number of edges in the control flow graph.

17. The apparatus of claim 16, wherein the static analysis circuitry is configured to store, a single set of event information for the plurality of possible paths, the single set of event information corresponding to, for each event in the single set of event information, a maximum number of occurrences of that event identified in the plurality of possible paths.

18. The apparatus of claim 16, wherein the reduced number of edges is a single edge.

19. A method comprising:
storing event information associated with a sequence of instructions occurring between instrumentation points, the event information indicative of a plurality of different types of events expected to occur during execution of the sequence of instructions, wherein the event information comprises, for each event of the plurality of different types of events, type information indicating a type of that event and an expected number of occurrences of that event;

in response to a start instrumentation point of the instrumentation points, assigning at least a subset of a plurality of programmable counters to measure, during execution of the sequence of program instructions, occurrences of the plurality of different types of events identified in the event information; and in response to at least one counter of the subset deviating from the expected number of occurrences of the event indicated by that counter, performing a predetermined action.

20. A method comprising:

storing information indicative of a sequence of instructions;

analysing the information indicative of the sequence of instructions to generate event information indicative of a plurality of different types of events expected to occur during execution of the sequence of instructions, wherein the event information comprises, for each event of the plurality of different types of events, type information indicating a type of that event and an expected number of occurrences of that event, defining the event information to cause monitoring circuitry to respond to an instrumentation point occurring during execution of the sequence of instructions by assigning at least a subset of a plurality of programmable counters to measure, during execution of the sequence of program instructions, occurrences of the plurality of different types of events identified in the event information, and to trigger the monitoring circuitry to respond to at least one counter of the subset deviating from the expected number of occurrences of the event indicated by that counter, by performing a predetermined action.

* * * * *